United States Patent
Yazawa et al.

(10) Patent No.: US 7,341,795 B2
(45) Date of Patent: Mar. 11, 2008

(54) FE-CR ALLOY STRUCTURE WITH EXCELLENT CORROSION RESISTANCE AND EXCELLENT ADHESION, AND MANUFACTURING METHOD THEREOF

(75) Inventors: Yoshihiro Yazawa, Toyko (JP); Osamu Furukimi, Toyko (JP); Yasushi Kato, Toyko (JP); Sadao Hasuno, Toyko (JP)

(73) Assignee: JFE Steel Corporation (JP)

( * ) Notice: Subject to any disclaimer, the term of this patent is extended or adjusted under 35 U.S.C. 154(b) by 334 days.

(21) Appl. No.: 10/601,453

(22) Filed: Jun. 23, 2003

(65) Prior Publication Data
US 2004/0137232 A1    Jul. 15, 2004

(30) Foreign Application Priority Data

| | | | |
|---|---|---|---|
| Jul. 1, 2002 | (JP) | ............... | 2002-191809 |
| Sep. 6, 2002 | (JP) | ............... | 2002-261479 |
| Sep. 6, 2002 | (JP) | ............... | 2002-261671 |
| Sep. 6, 2002 | (JP) | ............... | 2002-261773 |

(51) Int. Cl.
- B32B 15/08 (2006.01)
- B32B 15/16 (2006.01)
- B32B 15/18 (2006.01)
- B32B 37/14 (2006.01)
- B05D 7/00 (2006.01)

(52) U.S. Cl. ............ 428/596; 428/213; 428/334; 428/457; 428/598; 428/626; 428/658; 428/659; 428/681; 428/685; 427/216; 427/220

(58) Field of Classification Search .......... 428/596, 428/598, 601, 626, 666, 667, 681, 682, 685, 428/457, 213, 220, 334, 335, 418, 469, 658, 428/659; 427/216, 220, 287, 445
See application file for complete search history.

(56) References Cited

U.S. PATENT DOCUMENTS

| | | | | |
|---|---|---|---|---|
| 4,524,111 A | * | 6/1985 | Oka et al. ................. | 428/551 |
| 2002/0160180 A1 | * | 10/2002 | Yamamoto et al. ......... | 428/336 |
| 2003/0196715 A1 | * | 10/2003 | Sakamoto et al. ........... | 138/142 |

FOREIGN PATENT DOCUMENTS

| | | | |
|---|---|---|---|
| EP | 1 186 351 | | 3/2002 |
| JP | 63069872 | | 3/1988 |
| JP | 05065689 | | 3/1993 |
| JP | 11-277256 | * | 10/1999 |
| JP | 2000-303028 | * | 10/2000 |
| WO | WO 01/48265 | | 7/2001 |
| WO | WO 02/099154 | * | 12/2002 |

* cited by examiner

*Primary Examiner*—Michael E. LaVilla
(74) *Attorney, Agent, or Firm*—DLA Piper US LLP

(57) ABSTRACT

The invention provides a Fe—Cr alloy structure containing Cr of about 6% or more by mass but about 25% or less by mass, having a corrosion-resistant paint film containing metal powder having ionization tendencies greater than iron, with a content of the metal powder of about 20% or more by volume but about 60% or less by volume in a dry paint film, with a dry film thickness of about 5 µm or more but about 100 µm or less; and a manufacturing method thereof; whereby excellent corrosion resistance and excellent adhesion is provided.

18 Claims, 5 Drawing Sheets

UNIT: mm

UNIT: mm

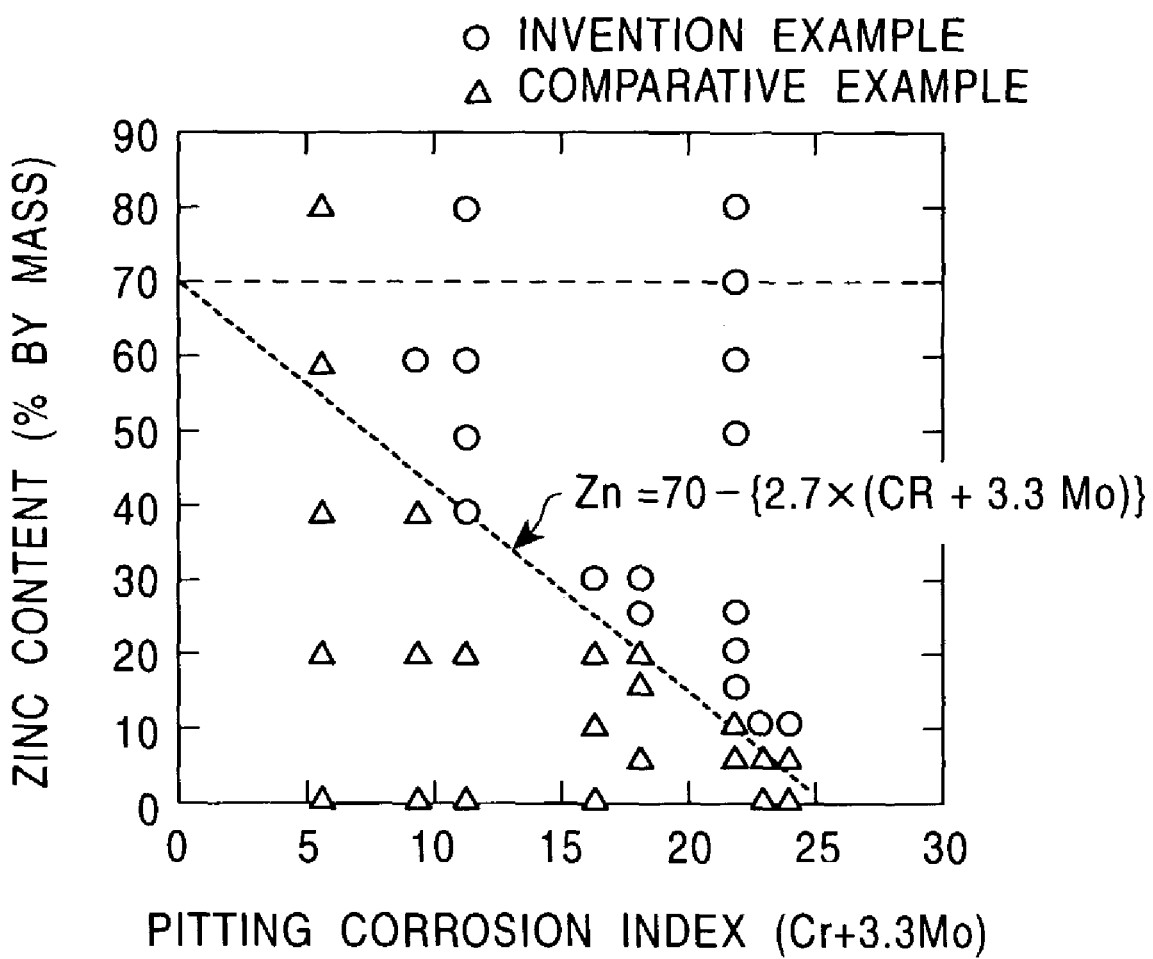

UNIT (mm)

PLATE THICKNESS 3mm

UNIT (mm)

| TIME | TEMPER-ATURE | HUMIDITY |
|---|---|---|
| 0.5 hr. | 35°C | $\geq 95\%$ |
| 1.0 hr. | 60°C | $\leq 40\%$ |
| 1.0 hr. | 40°C | $\geq 95\%$ |

FE-CR ALLOY STRUCTURE WITH EXCELLENT CORROSION RESISTANCE AND EXCELLENT ADHESION, AND MANUFACTURING METHOD THEREOF

BACKGROUND OF THE INVENTION

1. Field of the Invention

This invention relates to an Fe—Cr alloy structure and a manufacturing method for the structure, wherein a structure such as a member or a component for an electrical device, precision machining machine, automobile, building material, and the like, is formed of Fe—Cr alloy, a typical form of stainless steel, and wherein, in the event that a gap and/or seam is formed by formation or assembling, the corrosion resistance and paint film adhesion to the gap/seam is improved.

Furthermore, this invention relates to a stainless steel suitable for members disposed around the underside of an automobile (which will be referred to as "automobile underside members", in particular to a zinc-containing paint-applied Fe—Cr alloy structure, and a manufacturing method for the structure.

Moreover, the invention relates to a ferritic stainless steel which is suitably employed in containers or piping members, for organic fuel such as gasoline, methanol, or the like, and particularly relates to zinc-containing paint-applied ferritic stainless steel for a fuel tank or fuel tank peripheral members of an automobile, wherein zinc-containing paint has been applied to the entirety of stainless steel members for fuel tanks, or fuel tank peripheral members such as fuel pipes, tank bands, or the like, of an automobile, or has been applied to part thereof principally to improve the corrosion resistance of the gap/seam, and relates to a manufacturing method for the zinc-containing paint-applied ferritic stainless steel.

2. Description of the Related Art

Fe—Cr alloy, a typical form of stainless steel, (which is referred to as "Fe—Cr alloy" hereinafter) has been widely used for various purposes, wherein resistance to various types of corrosion is required, due to excellent corrosion-resistance, and in particular, in various purposes wherein the advantages of appearance, design, and being maintenance-free, are taken in full. However, it has been found that in practical-use environments, the corrosion resistance is not sufficient, and in particular, corrosion readily occurs at gaps/seams, welds, connected portions to dissimilar metal or other materials, or the like, (which is referred to as "gap portions" and "gaps" hereinafter), and the corrosion progresses.

For example, the corrosion resistance of a gap between plates formed by welding two plates, a gap between a bolt (metal fitting) and a base member, or the like, has been insufficient. Such gaps are formed in most structures, not to mention automobiles or building materials. Conventionally, the kind of Fe—Cr alloy is selected based upon the required corrosion resistance of the portion wherein highest corrosion resistance is required, i.e., the gaps, and accordingly, the selected alloy might have excessively high quality for portions other than gaps, or for use in a non-corrosive environment.

To improve the corrosion resistance of stainless steel, in particular, at gaps, an arrangement wherein metal with ionization tendencies higher than stainless steel is inserted into gaps, an arrangement wherein metal foil with ionization tendencies higher than stainless steel is placed over portions which are to be gaps after manufacturing, and an arrangement wherein paint containing metal with ionization tendencies higher than stainless steel is applied to the portions, have been proposed in Japanese Unexamined Patent Publication No. 11-79285.

However, with the arrangement wherein metal foil is placed over the portions, the number of manufacturing steps increases, and also the number of members increase. Hence, the arrangement is impractical, whereas the arrangement wherein the paint is applied to the portions can be made in a simple manner. Accordingly, we performed experiments wherein commercially-available zinc-rich paint (paint containing metal zinc powder) was applied to the gap and therearound of a testing sample for evaluation according to the Japanese Unexamined Patent Application Publication No. 11-79285, and the improvement of the corrosion resistance was observed in an experiment wherein the testing sample was exposed to an experimental corrosive environment. We discovered that in the event that the paint was applied to an actual structure, following which the structure was further processed, or the structure was transported, rust occurring in a conventional arrangement was observed in this arrangement, and the improvement of the corrosion resistance was insufficient.

Furthermore, a new discovery was made, that even in the event that zinc-rich paint is applied to a gap after processing, upon zinc being dissolved from the paint film due to extended use, the paint film becomes porous. This leads to further occurrence of corrosion due to penetration of salt particles, rain water, or the like, and also leads to paint film peeling, which damages the appearance.

Of structural members, in particular, automobile structural members are exposed to severe environments. Of the automobile structural members, strict corrosion resistance of gaps is required for underside members, and a material for those has been desired. Principal properties required for the automobile underside members will be described below:

1) The automobile underside members are welded to a car body. Thus, toughness is required for the welded portions. In particular, the properties of welded heat-affected zone (HAZ) depend upon the properties of the steel itself. Hence, it is important to improve the properties of the HAZ.

2) With the automobile underside members, gaps are formed due to forming or assembling. Adhesion or penetration of water, mud, sea-salt particles, road salt, or the like occurs at the gaps in practical-use environments. Accordingly, there is the need to improve the corrosion resistance, in particular, from the perspective of gap corrosion in the salty environments.

3) High tensile strength (TS) around 450 to 650 MPa is required for structural members.

As a result, conventionally, a material excellent in at least welded portion toughness, corrosion resistance (in particular, gap corrosion resistance), and strength (in particular, welded portion strength) has been required for automobile underside members. For example, in the event that the high-tensile steel of the ordinary steel is subjected to electrodeposition coating for painting corrosion-resistant paint, or is subjected to plating, to manufacture the automobile underside members, there is the need to perform corrosion-resistant processes under sufficient quality control so that rust never occurs due to painting, plating, or the like. Accordingly, large-size equipment is required for performing corrosion-resistant processing to prevent occurrence of uneven portions due to painting, plating, or the like, at end portions, scratches, welded portions, or the like, after manufacturing. This causes productivity decreases, and consequently, increases in costs for painting.

Accordingly, high strength stainless steel wherein painting or plating processing can be simplified, and also corrosion-resistant processes can be simplified with excellent corrosion resistance attracts attention as a material of automobile underside members.

For example, Cr-containing stainless steel wherein welded portion strength and toughness are improved has been studied in Japanese Unexamined Patent Publication No. 55-21566. Furthermore, to improve the corrosion resistance, various methods for improving properties by adjusting the chemical composition of steel have been studied in Japanese Unexamined Patent Application Publication No. 2002-20844.

However, arrangements in the conventional art have preconditions of improving the corrosion resistance of steel without painting. Accordingly, there is the need to add considerably a great quantity of Cr to the steel for maintaining corrosion resistance in salty environments. Furthermore, in the event that martensite structure is employed in the steel for securing the strength and toughness as automobile underside members, there is the need to add expensive alloy elements such as Ni, Cu, or the like, which are austenite stabilizing elements, to the steel.

Conventionally, ternes steel sheets (Pb—Sn) wherein the surface of mild steel plates have been subjected to plating including Pb have been widely used for automobile fuel tanks and fuel tank peripheral members (fuel pipes and so forth). However, in recent years, use of materials containing Pb has been severely restricted because of increasing environmental problems. Therefore, development of alternative materials for ternes steel sheets is being undertaken.

For example, a steel plate subjected to Al—Si alloy plating as unleaded plating, and further subjected to conversion treatment for improving salt-induced corrosion resistance, has been proposed in Japanese Unexamined Patent Publication No. 2002-146553. However, there are problems of weldability and deterioration of corrosion resistance over time. Thus, the steels have not been widely used. Furthermore, in the event that large-size equipment is prepared for obtaining the steel plates, the costs increase, leading to low productivity, and consequently, the arrangement cannot sufficiently meet the demands for mass production.

Furthermore, stainless steel for fuel tanks, which secures resistance weldability, press-workability due to lubrication hardening, and corrosion resistance by zinc or a lubricant film containing zinc being painted on the plate prior to processing, has been proposed in Japanese Unexamined Patent Application Publication No. 2002-146557.

However, the steel plate coated with zinc-containing lubrication film is subjected to resistance welding, carbon is mixed from the resin components of the film into the welded portion, and consequently, deterioration of corrosion resistance could occur due to the sensitivity thereof. Furthermore, in the event that the steel plate having a zinc-containing lubrication film is subjected to press-forming, peeling powder markedly occurs in pressing as compared with a lubrication film containing no zinc, leading to difficulties in maintenance of molds.

Furthermore, use of austenitic stainless steel of which a typical form is SUS304 stipulated by JISG4305 (cold-rolled stainless steel plate and steel strip) is being undertaken as steel which can be use without lining processing; However, there is the problem of stress corrosion cracking (SCC) with regard to use in fuel tanks, and consequently, the arrangement has not been put to practical use, either.

Moreover, use of synthetic resin having multilayer structures for fuel tanks is being undertaken. However, penetration of minute amounts of fuel from the wall face of the fuel tank formed of resin is unavoidable. Furthermore, there is a fundamental problem of fuel evaporation. Also, there is an inherent limit in application of synthetic resin in practical use from the points of restriction of fuel evaporation and restriction for recycling.

On the other hand, ferritic stainless steel, of which typical forms are SUS430 and SUS436L stipulated by JISG4305 has low sensitivity with regard to stress corrosion cracking as compared with the aforementioned austenitic stainless steel. Furthermore, the content of expensive Ni is low, so the ferritic stainless steel has a cost advantage. However, in the event of employing the ferritic stainless steel in fuel tanks or fuel pipes, principally, there is a problem of corrosion resistance of the outer face thereof against salt-induced corrosion being insufficient. Therefore, there is the need to add a great quantity of alloy elements such as Cr, Mo, or the like, into the ferritic stainless steel. However, deterioration of workability occurs accompanying high alloying, so great tube expansion or bending cannot be performed for fuel pipes, for example, leading to limits in forming shapes.

OBJECTS OF THE INVENTION

It is an object of the invention to provide a Fe—Cr alloy structure and a manufacturing method for the Fe—Cr alloy structure, wherein corrosion of the Fe—Cr alloy structure, in particular, corrosion of gaps of the Fe—Cr alloy structure, is sufficiently prevented even in practical-use environments over time, so deterioration of strength of the structure due to corrosion never occurs, corrosion resistance is improved to withstand extended use, and furthermore, the appearance of the paint-applied portions, in particular, the appearance of the gaps and adhesion of corrosion-resistant paint film, is improved.

Also, it is an object of the invention to provide a Fe—Cr alloy structure and a manufacturing method for the Fe—Cr alloy structure, to which zinc-rich paint is applied to improve corrosion-resistance, wherein excellent corrosion resistance of gaps is obtained in practical-use environments so that deterioration of strength of the structure does not occur, thereby withstanding extended use.

Also, the invention has been made for meeting demands regarding problems with employing conventional low-cost low-Cr-containing Fe—Cr alloy to automobile underside members in that the corrosion resistance thereof is insufficient, and demands for development of a method for improving corrosion-resistance in a simple manner, and accordingly, it is an object of the invention to provide Fe—Cr alloy with excellent corrosion-resistance, strength, workability, toughness, and weldability, which can be applied to automobile underside members.

Also, it is an object of the invention to provide low-Cr-containing ferritic stainless steel with more corrosion-resistance and workability than conventional high-Cr-containing ferritic stainless steel, for automobile fuel system members.

That is to say, it is an object of the invention to provide low-Cr-containing, i.e., low-cost ferritic stainless steel for solving the problems in the conventional art regarding outer-face corrosion resistance against salt damage of fuel tanks and fuel pipes of automobiles subjected to processing and welding. Note that the corrosion resistance standard for the ferritic stainless steel for automobile fuel system members of the invention is that slight red rust or stain rust never occurs following 120 cycles in salt-dry-wet combined cycle testing (CCT; American Society of Automotive Engineers (SAE J 2334)).

SUMMARY OF THE INVENTION

The composition of the invention is as follows.

A Fe—Cr alloy structure containing about 6% by mass or more, but about 25% by mass or less of Cr, has, on the surface thereof including at least a gap portion, a corrosion-resistant film containing metal powder having ionization tendencies greater than iron, wherein the metal powder content in a dry paint film is about 20% or more by volume but less than about 60% by volume, and wherein the dry paint film thickness is about 5 μm or greater but less than about 100 μm.

The metal powder may be one or more types selected from Mg, Al, and Zn. The corrosion-resistant film may primarily contain epoxy resin, and for the remainder thereof comprise a drying agent, a hardening agent, a plasticizer, a dispersant, and an emulsifier.

The metal powder may be zinc, wherein the zinc content in the dry paint film is an amount as to the weight of the paint film indicated in Expression (1):

$$70-\{2.7\times(Cr+3.3Mo)\} \leq X \leq 70 \tag{1}$$

wherein X is the metal zinc powder content (% by mass) in the paint film,
and wherein Cr is the Cr content (% by mass) in the Fe—Cr alloy,
and wherein Mo is the Mo content (% by mass) in the Fe—Cr alloy.

The average particle diameter of the metal powder may be about 3 μm or smaller. The composition of the Fe—Cr alloy structure may be, in terms of % by mass, about 0.02% or less of C, about 1.0% or less of Si, about 0.5% or more, but about 5.0% or less of Mn, about 0.05% or less of P, about 0.020% or less of S, about 6% or more, but about 20% or less of Cr, about 1.0% or less of Al, and about 0.03% or less of N, with the remainder being essentially Fe and unavoidable impurities, thus forming an alloy steel with a tensile strength (TS) of about 450 to about 650 MPa, and wherein the dry paint film thickness of the dry paint film is about 5 to about 50 μm.

The Fe—Cr alloy structure may further contain, in terms of % by mass, about 3% or less of Mo, about 2% or less of Cu, and about 9% or less of Ni. The Fe—Cr alloy structure may further contain, in terms of % by mass, about 0.0003% or more, but about 0.005% or less of B. The Fe—Cr alloy structure may be used for the underside members of an automobile.

The Fe—Cr alloy structure may be a ferritic stainless steel, with a composition of, in terms of % by mass, about 0.1% or less of C, about 1.0% or less of Si, about 1.5% or less of Mn, about 0.06% or less of P, abut 0.03% or less of S, about 1.0% or less of Al, about 11% or more, but about 20% or less of Cr, and about 0.04% or less of N, and further contains about 0.01% or more, but about 0.8% or less of Nb and/or about 0.01% or more, but about 1.0% or less Ti, with the remainder being essentially Fe and unavoidable impurities.

The Fe—Cr alloy structure may further contain one or more components selected from the group consisting of, in terms of % by mass, about 3.0% or less of Mo, about 2.0% or less of Cu, and about 2.0% or less of Ni. The Fe—Cr alloy structure may further contain, in terms of % by mass, about 0.0003% or more, but about 0.005% or less of B. The Fe—Cr alloy structure may be used for the fuel tank and peripheral members of the fuel tank of an automobile. The average particle diameter of Zn in the Zn-containing dry paint film may be about 3 μm or smaller.

A method for manufacturing an Fe—Cr alloy structure is carried out by applying, on the surface an Fe—Cr alloy structure containing-about 6% by mass or more, but about 25% by mass or less of Cr including at least a gap portion, a corrosion-resistant film containing metal powder having ionization tendencies greater than iron, to a dry film thickness of about 5 μm or greater, but less than about 100 μm, so that the metal powder content in the dry paint film is about 20% or more by volume, but less than about 60% by volume.

The metal powder may be one or more components selected from Mg, Al, and Zn. The corrosion-resistant film may primarily contain epoxy resin, and for the remainder thereof comprises a drying agent, a hardening agent, a plasticizer, a dispersant, and an emulsifier.

The zinc content in the dry paint film may be an amount as to the weight of the paint film indicated in Expression (1):

$$70-\{2.7\times(Cr+3.3Mo)\} \leq X \leq 70 \tag{1}$$

wherein X is the metal zinc powder content (% by mass) in the paint film,
and wherein Cr is the Cr content (% by mass) in the Fe—Cr alloy,
and wherein Mo is the Mo content (% by mass) in the Fe—Cr alloy.

The average particle diameter of the metal powder may be about 3 μm or smaller. The composition of the Fe—Cr alloy structure may be, in terms of % by mass, about 0.02% or less of C, about 1.0% or less of Si, about 0.5% or more, but about 5.0% or less of Mn, about 0.05% or less of P, about 0.020% or less of S, about 6% or more, but about 20% or less of Cr, about 1.0% or less of Al, and about 0.03% or less of N, with the remainder being essentially Fe and unavoidable impurities, thus forming an alloy steel with a tensile strength (TS) of about 450 to about 650 MPa.

The Fe—Cr alloy structure may further contain, in terms of % by mass, about 3% or less of Mo, about 2% or less of Cu, and about 9% or less of Ni. The Fe—Cr alloy structure may further contain, in terms of % by mass, about 0.0003% or more, but about 0.005% or less of B. The Fe—Cr alloy structure may be used for the underside members of an automobile.

The Fe—Cr alloy structure may be a ferritic stainless steel, with a composition of, in terms of % by mass, about 0.1% or less of C, about 1.0% or less of Si, about 1.5% or less of Mn, about 0.06% or less of P, about 0.03% or less of S, about 1.0% or less of Al, about 11% or more, but about 20% or less of Cr, and about 0.04% or less of N, and further contains about 0.01% or more, but about 0.8% or less of Nb and/or about 0.01% or more, but about 1.0% or less of Ti, with the remainder being essentially Fe and unavoidable impurities.

The Fe—Cr alloy structure may further contain one or more components selected from, in terms of % by mass, about 3.0% or less of Mo, about 2.0% or less of Cu, and about 2.0% or less of Ni. The Fe—Cr alloy structure may further contain, in terms of % by mass, about 0.0003% or more, but about 0.005% or less of B. The Fe—Cr alloy structure may be used for the fuel tank and peripheral members of the fuel tank of an automobile. The average particle diameter of Zn in the Zn-containing dry paint film may be about 3 μm or smaller.

According to the invention, the corrosion resistance and corrosion-resistant paint film adhesion of gaps of a Fe—Cr alloy structure can be markedly improved, thereby obtaining a structure, which withstands extended use, with excellent appearance, and wherein deterioration of strength never occurs. Furthermore, the content of Cr and Mo can be reduced as compared with the conventional Fe—Cr alloy structure containing a large quantity of expensive Cr or Mo due to prevention of corrosion at gaps. Thus, the invention has the advantage of the costs of manufacturing being markedly reduced.

Furthermore, according to the invention, low-cost Fe—Cr alloy with low contents of Cr and Ni can be applied to automobile underside members where high corrosion-resistance in salty environments, high strength, excellent workability, toughness, excellent weldability, and excellent balance are required, substituting for the conventional stainless steel containing a large quantity of expensive Cr and Ni, by improving the corrosion resistance of gaps with sacrificial corrosion-resistance from zinc.

Furthermore, according to the invention, low-cost ferritic stainless steel with low contents of Cr and Ni can be applied to fuel tanks and the peripheral members thereof for automobiles or the like where excellent outer-face-corrosion resistance and excellent gasoline-corrosion resistance in salty environments, high strength, excellent workability, with these properties being balanced, are required.

BRIEF DESCRIPTION OF THE DRAWINGS

FIG. 1A is a three-dimensional drawing illustrating testing of an L-shaped testing piece, with gravel testing or the like;

FIG. 1B is a plan view illustrating testing of an L-shaped testing piece, with gravel testing or the like;

FIG. 3 is a graph illustrating the relation between the pitting index (Cr+3.3 Mo) affecting the acceptance or rejection of corrosion-resistance, and the amount of zinc contained in the corrosion resistant film;

DETAILED DESCRIPTION

Figure 1A:
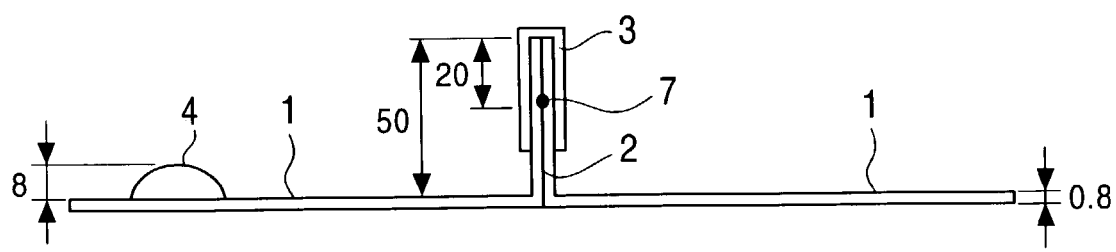

Description will be made below regarding selected preferred embodiments according to aspects of the invention.

An arrangement of the invention is achieved by paint containing metal powder with ionization tendencies higher than iron being applied to a Fe—Cr alloy structure to form an anti-corrosion dry paint film thereupon with the content by volume of the metal powder and the thickness of the film being determined, so that sacrificial corrosion-resistance is maintained due to the paint, and furthermore, even in the event that the Fe—Cr alloy structure having the corrosion resistant dry paint film formed of the paint is processed or transported, occurrence of rust at gaps where rust particularly readily occurs is prevented, thereby realizing paint adhesion following extended use and improvement of appearance of painted portions.

Description will be made below regarding reasons for determination with regard to principal components of the invention.

(1) Composition of Fe—Cr Alloy

It is necessary for the Cr content of Fe—Cr alloy forming a structure according to the invention to be about 6% by mass to about 25% by mass. In the case of the Cr content of the structure being less than about 6% by mass, even in the event the structure is used in an indoor or outdoor atmosphere, red rust markedly occurs, and it is difficult to secure sufficient corrosion-resistance at gaps.

In the case of the Cr content of the structure being greater than about 25% by mass, the corrosion-resistance of the Fe—Cr alloy itself is improved, so there is little need to apply corrosion-resistant paint containing metal powder for sacrificial corrosion-resistance. Accordingly, the preferred Cr content is about 11 to about 20% by mass.

Components other than Cr are not particularly restricted. Elements such as C, Si, Mn, Ni, Cu, Mo, W, Nb, Ti, Zr, V, B, Al, N, or the like, may be added, according to workability, strength, and other purposes, as appropriate. In particular, Mo is effective for improvement of corrosion-resistance, and the content is about 0% by mass to about 3.0% by mass, and is preferably about 0.5% by mass to about 2.0% by mass.

(2) Fe—Cr Alloy Structure

A structure of the invention is formed by forming or assembling one or more members of the aforementioned Fe—Cr alloy so that gaps are formed, and the structure, shape, or size, is not restricted. For example, an arrangement may be made wherein a sheet of Fe—Cr alloy plate is bent, and both ends are connected by welding, caulking, or bolting, or an arrangement may be made wherein multiple members where Fe—Cr alloy plates that have been subjected to press-formation are integrated by means of welding, caulking, or bolting. However, the invention is not restricted to the aforementioned arrangements.

We believed that it would be effective to employ sacrificial corrosion-resistance of metal powder with ionization tendencies higher than iron, such as zinc or the like, to prevent corrosion at gaps of a structure formed of Fe—Cr alloy as shown in the aforementioned prior art. However, as described above, in the case of applying commercially-available zinc-content zinc-rich paint for ordinary steel, for example, in the event that the structure suffers scratches from scattering stones or the like, or the structure is subjected to a force so that the joints such as bolts are contracted due to vibration, particularly in manufacturing or transporting, the paint film is partially peeled off, and sufficient corrosion-resistance cannot be realized in practical-use environments.

Also, in the event that most of metal powder in the paint film is lost due to extended use in practical environments, the paint film becomes porous, and furthermore, salt particles, rain water, and dusts enter the pores, not only leading to deterioration of corrosion-resistance due to corrosion at gaps, but also leading to damage of paint-film adhesion and appearance.

That is, we improved the paint having sacrificial corrosion-resistant effects, of which a typical form is conventional zinc-rich paint which has been developed and is in practical use for ordinary steel, for Fe—Cr alloy, and researched the phenomena of occurrence of rust, staining, and deterioration of paint-film adhesion with regard to the Fe—Cr alloy having a corrosion-resistant film thereupon due to use in practical-use environments such as in manufacturing, transporting, or the like, in detail. As a result, we discovered that deterioration of corrosion-resistance, deterioration of paint-film adhesion, and deterioration of appearance of painted portions are caused not only by peeling of corrosion paint film having sacrificial corrosion-resistant effects due to impacts, friction, or vibration from the outside of the structure, but also by the paint film becoming porous due to dissolution of metal powder having the sacrificial corrosion-resistant effect.

The commercially-available zinc-rich paint having excellent corrosion-resistance for ordinary steel is paint which employs the sacrificial corrosion-resistant effects of zinc, and is used with zinc-content greater than 60% by volume in a dry paint film, to secure the corrosion-resistant effect. That is to say, the zinc-rich paint is used with zinc-content greater than 70% by mass in a dry paint film.

We studied the adhesion between the corrosion-resistant paint film and Fe—Cr alloy, stains at painting portions, and the corrosion-resistant effect. As a result, we discovered that commercially-available paint which has been developed primarily for ordinary steel has excessively high quality from at least the perspective of corrosion-resistance, for Fe—Cr alloy which has more corrosion-resistance than ordinary steel, and furthermore, reduction of the amount contained of sacrificial corrosion-resistant metal powder does not decrease corrosion-resistance, and poor adhesion which has been a problem with regard to arrangements wherein commercially-available paint for ordinary steel is applied to Fe—Cr alloy can be improved, thereby obtaining sufficient adhesion.

We found that, in the case of Fe—Cr alloy, even in the event of applying sacrificial corrosion-resistant paint in an amount to be less than that as with ordinary steel, i.e., in the event of applying the paint with a content of sacrificial corrosion-resistant metal powder equal to or greater than about 20% by volume and less than about 60% by volume as to the entire volume after drying, excellent corrosion-resistant effects, and sufficient adhesion and stain prevention, can be realized for the Fe—Cr alloy.

(3) Sacrificial Corrosion-resistant Metal Powder

Typical metals having ionization tendencies greater than iron employed in the invention are magnesium, aluminum, and zinc, or a compound or an alloy from one or more of the aforementioned metal elements. Of these, zinc is preferably employed from the perspective of generality and costs.

(4) Content of Sacrificial Corrosion-resistant Metal Powder

In the event that the content of sacrificial corrosion-resistant metal powder exceeds 60% by volume in the entirety of dry corrosion-resistant paint film, deterioration of primary adhesion to the surface of stainless steel is caused. In particular, in the event that scratches or the like are caused due to scattering stones or the like, the paint itself readily peels, and deterioration of adhesion occurs, leading to difficulties in securing an effective zinc amount. Furthermore, in the event of increasing the content of sacrificial corrosion-resistant metal powder, deposition of the sacrificial corrosion-resistant metal powder is caused at the bottom of the paint, so there is the need to incessantly mix the paint to keep the paint uniform, leading to deterioration of efficiency in painting processes. Accordingly, the upper limitation of the content of sacrificial corrosion-resistant metal powder has been determined to be less than about 60% by volume for effectively employing the sacrificial corrosion-resistant metal powder from the perspective of corrosion-resistance and adhesion. Furthermore, the content of at least about 20% by volume or more is required for maintaining corrosion-resistance.

Note that the content of the sacrificial corrosion-resistant metal powder is preferably equal to or greater than about 30% by volume and equal to or less than about 50% by volume. Furthermore, the content thereof is optimally equal to or greater than about 35% by volume and equal to or less than about 45% by volume. The reason for the content of the sacrificial corrosion-resistant metal powder being determined with percentage by volume is that the adhesion of Fe—Cr alloy, which is poorer than ordinary steel, is secured by adjusting the ratio of resin in the paint as to metal powder such as zinc and so forth while keeping the corrosion-resistance. Note that the content (percentage by volume) is determined by the procedures wherein following application of the paint, the cross-section of a dry paint film is observed with a under a microscope magnified 400 times for each of five views with the observed images being subjected to image processing by a computer. Note that the content (percentage by volume) obtained in each embodiment is calculated by averaging five contents (percentage by volume) obtained from these five views.

(5) Content of Zinc Powder

According to the invention, an arrangement is made wherein the content of metal zinc in a corrosion-resistant paint film and the thickness thereof are determined to obtain a Fe—Cr alloy structure wherein occurrence of rust is particularly prevented at gaps where rust particularly readily occurs even when manufacturing or transporting the Fe—Cr alloy structure having the corrosion-resistant paint film from zinc-rich paint, while maintaining the sacrificial corrosion-resistant effect of the zinc-content zinc-rich paint.

In the event that the zinc content exceeds about 70% by mass as to the entire mass of the dry corrosion-resistant film, deterioration of primary adhesion to the surface of stainless steel occurs. In particular, in the event that scratches are caused due to scattering stones, the paint itself readily peels, deterioration of adhesion is caused, and it is difficult to secure the effective zinc amount. Conversely, in the event that zinc content is too great, deposition of zinc occurs at the bottom of the paint, so there is the need to incessantly mix the paint to keeping the paint uniform. Accordingly, to efficiently employ zinc, the content of zinc has been determined to have an upper limitation of about 70% by mass from the perspective of corrosion-resistance and appearance.

On the other hand, it is known that the corrosion resistance of Fe—Cr alloy has positive relation to the pitting index (Cr+3.3 Mo). We researched the relation between the content of zinc in the paint required for further improving corrosion-resistance at gaps and the aforementioned pitting index. As a result, as shown in FIG. 3, we discovered that in the event that the content of zinc (percentage by mass) is equal to greater than 70−{2.7×(Cr+3.3 Mo)}, sufficient corrosion-resistance at gaps is obtained for the Fe—Cr alloy.

Thus, the content of zinc X is determined with the following Expression (1).

$$70-\{2.7\times(Cr+3.3\ Mo)\} \leq X \leq 70 \quad (1)$$

wherein X denotes the content (percentage of mass) of metal zinc powder in the paint film, wherein Cr denotes the content (percentage of mass) of Cr in the Fe—Cr alloy, and wherein Mo denotes the content (percentage of mass) of Mo in the Fe—Cr alloy. Mo is not a necessary component, and in the event that the alloy contains no molybdenum, calculation is made with Mo being about 0% by mass in the aforementioned Expression (1).

The required content of zinc in the corrosion-resistant paint film depends upon the pitting index, i.e., the corrosion resistance of the Fe—Cr alloy. That is to say, in the event of the corrosion resistance being excellent, the content of zinc in the paint film can be small, whereas in the event of the corrosion resistance being poor, there is the need to increase the content of zinc thereof.

As a result, the lower limitation of the zinc content in the corrosion-resistant paint film of about 2.5% by mass is calculated from Expression (1) with the Cr content of about 25% by mass and the Mo content of about 0% by mass. Note that in the event that the Cr content exceeds about 25% by mass, the corrosion resistance is sufficient in neutral salt environments, and accordingly, there is no need to form a corrosion-resistant film. Note that application of a paint film with Zn content of about 0% by mass has few advantages such as coloring of the surface, and leads to high costs from the perspective of securing of corrosion-resistance, and there is no need to apply the paint so long as high Cr-component stainless steel is employed.

Note that description will be made below regarding the procedures for obtaining zinc particle content (percentage by mass) in a dry paint film. First, the weight of the steel (W1) was measured with a dry paint film being coated thereupon, following which the steel plate and the paint film were separated using paint film remover (NEORIVER (phonetic spelling)), the steel plate was dried and the weight of the dry steel plate (W2) measured. Subsequently, the removed paint film was dissolved using sulfuric acid or perchloric acid so that the solution was analyzed with the atomic absorption method, whereby the quantity of zinc (W3) was obtained. The zinc-particle content in a dry paint film can be obtained with the expression W3/(W1-W2).

(6) Average Particle Diameter of Sacrificial Corrosion-resistant Metal Powder

Note that the sacrificial corrosion-resistant metal powder employed in the invention is preferably uniformly dispersed in the paint film preferably with the average particle diameter of about 3 µm or less. In the case that the average particle diameter exceeds about 3 µm, adhesion becomes poor in the event that the paint film is thin. Furthermore, in the event that the metal powder is dispersed in the paint film with a minute particle diameter, the paint exhibits a tendency for the adhesion following application to be improved while the sacrificial corrosion-resistant performance due to the metal powder is improved. Thus, the average particle diameter of the sacrificial corrosion-resistant powder is preferably about 3 µm or less, and furthermore, is preferably equal to or greater than about 1.5 µm and equal to or less than about 2.5 µm from the above-described perspective.

The particle diameter of the metal powder is defined as a value wherein the sum of the maximal and minimal particle diameters of one metal particle is divided by 2. The average particle diameter was obtained by the procedures wherein following application of the paint, the cross-section of a dry paint film was observed under a microscope at magnification of 400 times for the five views to obtain the particle diameters of each metal powder for all the particles in the views according to the above-described procedures, and the obtained particle diameters were averaged.

(7) Zinc Average Particle Diameter

In particular, zinc is an important element for securing corrosion resistance of a Fe—Cr alloy such as stainless steel or the like due to sacrificial corrosion-resistance. The average particle diameter is about 3 µm or less. In the case that the average particle diameter exceeds about 3 µm, in the event that the paint film is thin, the adhesion of the paint film to the stainless steel becomes poor. Furthermore, in the event that the zinc powder is dispersed in the paint film with a minute particle diameter, the paint exhibits a tendency for the sacrificial corrosion-resistant performance due to zinc to be improved. Thus, the average particle diameter is preferably about 3 µm or less. The average particle diameter is preferably about 1.0 to about 2.5 µm, and furthermore, is preferably about 0.5 to about 2.0 µm.

(8) Film Thickness of Corrosion-resistant Paint Film

The film thickness of the corrosion-resistant film is determined to be equal to or greater than about 5 µm and less than about 100 µm in a dry film thickness. In the case that the film thickness is less than about 5 µm, in the event that the content of the sacrificial corrosion-resistant metal powder increases, it becomes difficult to secure adhesion. Furthermore, while the sacrificial corrosion-resistant capabilities depend upon the content of the sacrificial corrosion-resistant metal powder per unit area, in the event that the film thickness is less than about 5 µm, the required contents of the sacrificial corrosion-resistant metal powder cannot be secured. On the other hand, in the event that the film thickness is about 100 µm or more, the quality is excessively high, drying time for the paint film becomes long, processing efficiency is reduced, and adhesion of the paint film becomes poor. The film thickness is more preferably equal to or greater than about 20 µm and equal to or less than about 50 µm.

Note that in the case of a paint film containing zinc, the film thickness is preferably about 50 µm or less. The film thickness is more preferably equal to or greater than about 10 µm and equal to or less than about 50 µm, and is even more preferably equal to or greater than about 10 µm and equal to or less than about 30 µm, and is particularly preferably equal to or greater than about 15 µm and equal to or less than about 30 µm. Moreover, the film thickness is preferably equal to or greater than about 15 µm and equal to or less than about 25 µm, if possible. Note that the measurement of thickness of a dry paint film was performed by the procedures wherein following application of the paint, the cross-section of the dry paint film was observed with a magnification of 400 times for the five views so that three film thicknesses were measured at three portions for each view, and the average film thickness was obtained by averaging the measured film thicknesses for each view, and furthermore, the averaged thicknesses were averaged for all the five views.

(9) Components Other Than Sacrificial Corrosion-resistant Metal Powder in Paint

The paint employed in the invention may contain components other than the sacrificial corrosion-resistant metal powder. However, the additional components are not particularly restricted, and additives, solutions, and diluents, or the like, such as a binder, drying agent, hardening agent, plasticizer, dispersant, emulsifier, or the like, for example, may be added for dispersing the paint, drying or hardening the paint film, and improving each property.

The addition of the dispersant or emulsifier for suspending the sacrificial corrosion-resistant metal powder in the paint in a stable manner can be made less than as compared with the conventional paint containing sacrificial corrosion-resistant metal powder.

Commonly-used acrylic resin, vinyl chloride resin, polyvinyl acetate resin, silicon resin, vinyl acetal resin, polyurethane resin, polyarylate resin, phenol resin, epoxy resin, alkaloid resin, polyamide resin, polyimide resin, or a combination of these resins, or the like, may be employed as a binder. Also, calcium fluoride, barium fluoride, sodium silicate, or the like, may be employed as an inorganic binder. Epoxy resin, polyurethane resin, or acrylic resin is preferably employed. In particular, epoxy resin is preferably employed from the perspective of adhesion and corrosion-resistance of the paint film.

Addition of the binder should be determined as appropriate, based upon the required properties according to the kind of resin and addition of additives such as a drying agent, hardening agent, plasticizer, dispersant, emulsifier, or the like.

In particular, with the zinc-containing paint employed in the invention, addition of components other than zinc as a necessary component serving as sacrificial corrosion-resistant metal is made as described above.

(10) Application Method for Paint

Application of the paint may be made with spray application, brush application, soaking into the paint, or the like, and the method for application is not particularly restricted. An appropriate method should be selected according to the production line for manufacturing structures.

Specifically, the method for application should be selected as appropriate according to the production line for manufactured goods such as automobile underside members, fuel tanks, or the like.

For example, steel plates are formed and processed into fuel tank peripheral members such as fuel tanks, fuel pipes, fuel bands, or the like, with predetermined methods such as hydraulic pressing, opposed fluid forming, spinning, pipe processing, or the like, following which zinc-containing paint is applied to the entirety or a part of the members configured in a predetermined structure form with seam welding, laser welding, spot welding, or the like.

The paint containing sacrificial corrosion-resistant metal powder can be classified into the room temperature setting type and the heat setting type, depending upon the kinds of hardening agents. In the case of the room temperature setting type, the member with applied paint thereupon is left as it is following application of the paint. On the other hand, in a case of the heat setting type, the member with applied paint is subjected to heating and drying (baking). As a result, a cured film formed of binders, sacrificial corrosion-resistant metal powder, and additives, i.e., a corrosion-resistant paint film with excellent corrosion-resistance is formed.

In particular, zinc-containing paint applied Fe—Cr alloy, wherein the paint containing zinc serving as sacrificial corrosion-resistant powder has been applied to manufacturing goods formed of Fe—Cr alloy, has excellent strength, weldability, workability, corrosion-resistance, with these properties being balanced, and thus, the zinc-containing paint applied Fe—Cr alloy can be applied to automobile underside members.

Also, the stainless steel applied with zinc-containing paint wherein the zinc-containing paint has been applied to a stainless steel has excellent strength, weldability, workability, corrosion-resistance, with these properties being balanced, and thus, the stainless steel applied with zinc-containing paint can be applied to automobile fuel tanks and fuel tank peripheral members.

According to the invention, while a corrosion-resistant paint film containing sacrificial corrosion-resistant metal powder is formed on the surface of a Fe—Cr alloy structure, the corrosion resistant film may be formed on a part or the entirety of the surface of the structure, so long as the region where the film has been applied includes all gaps formed in the structure. The aforementioned paint film is formed to improve the corrosion resistance at the gaps, and accordingly, in the event that the portions are coated with the aforementioned paint film at the very least, the corrosion resistance of the entirety of the Fe—Cr alloy structure is sufficient.

(11) Manufacturing Method for Fe—Cr Alloy

The manufacturing method for the Fe—Cr alloy employed in the invention is not particularly restricted, but the manufacturing method employed for ordinary steel can be employed without changes. Description will now be made regarding a preferable manufacturing method example.

A steel material containing the aforementioned components with the aforementioned contents, which has been obtained by continuous casting, is heated to a predetermined temperature as necessary to be formed into hot-rolled sheets with a predetermined sheet thickness by hot rolling, following which the hot-rolled sheets are subjected to box annealing in the temperature range between about 600° C. and about 900° C., or are subjected to continuous annealing in the temperature range between about 800° C. and about 1100° C. according to the required strength level. Subsequently, the hot-rolled sheets are formed into manufactured goods without additional prior processing, or following being subjected to pickling as necessary. Furthermore, the hot-rolled sheets after annealing is subjected to cold rolling with a predetermined sheet thickness, following which the cold-rolled sheets are subjected to continuous annealing preferably in the temperature range between about 700° C. and about 1050° C., and more preferably in the temperature range between about 850° C. and about 1000° C., and are subjected to pickling, whereby cold-rolled steel sheets of Fe—Cr alloy are formed.

The above-described manufacturing method is only an example, and may be modified as appropriate.

(12) Composition of Fe—Cr Alloy for Automobile Underside Members

The Fe—Cr alloy employed in the automobile underside members according to the invention is formed with a tensile strength (TS) range between about 450 MPa and about 650 MPa. In the event of TS being less than about 450 MPa, the strength is insufficient for being employed in the automobile underside members. Conversely, in the event of TS being greater than about 650 MPa, the steel is too hard, so it is difficult to performing processing such as bending or the like. Description will be made below regarding the compositions and contents (% by mass) for the Fe—Cr alloy employed in the present invention.

Cr: Content of About 6% or More and About 20% or Less

In the case of the content of Cr being less than about 6%, in the event that the Cr—Fe alloy is exposed in the indoor or outdoor atmosphere environments with no paint being applied thereupon, red rust markedly occurs, and even in the event that the zinc-containing paint is applied on the Cr—Fe alloy, it is difficult to secure sufficient corrosion-resistance at gaps, scratches due to scattering stones, or end faces. Furthermore, costs for the paint increase for compensating for reduction of contents of Cr and Mo, and sufficient effects of the above-described zinc-containing paint are not obtained. Accordingly, the lower limitation of the content of Cr has been determined to be about 6%. The content of Cr is preferably equal to or greater than about 11% for ensuring the corrosion-resistance as Fe—Cr alloy to a certain degree. In the event that the content of Cr exceeds about 20%, the corrosion resistance of the Fe—Cr alloy itself is improved, so occurrence of red rust is not observed, and consequently, there is no need to apply the paint. Accordingly, the content of Cr is preferably in the range between about 11% and about 15%.

Si: Content Equal to or Less Than About 1.0%

Si has deoxidation effects, and accordingly is a necessary component in steel making. Addition of about 0.1% or more is required for obtaining the effect. In the event that content of Si exceeds about 1.0%, the steel becomes too hard (alloy reinforcing), and also generating of the martensite phase occurring at HAZ is obstructed. Accordingly, the content of Si should be less than about 1.0%. The content of Si is preferably equal to or greater than about 0.10% and equal to or less than about 0.5%.

Mn: Content Equal to or Less Than About 0.5% and Equal to or Less Than About 5.0%

Mn is a necessary component for stabilizing the γ (austenite) phase at a high temperature to improve hardenability. The content of Mn is equal to or greater than about 0.5%. Conversely, in the event that the content of Mn exceeds about 5.0%, the steel becomes too hard, and also the toughness at HAZ is reduced. Thus, the upper limitation of the content of Mn is determined to be about 5.0%. The content of Mn is preferably determined to be equal to or greater than about 1.0% and equal to or less than about 2.0%.

P: Content Equal to or Less Than About 0.05%

The content of P is preferably reduced as much as possible from the perspective of workability and corrosion-resistance. Reduction of the content of P also has an effect wherein the precipitation of minute phosphide in the steel, which causes the steel to be too hard, is suppressed. Excessive reduction increases refinery load, leading to reduction of productivity, so the content of P should be equal to less than about 0.05%, and is preferably is equal to or greater than about 0.01% and equal to or less than about 0.03%.

S: Content Equal to or Less Than About 0.020%

While the content of S is preferably reduced as much as possible to ensure corrosion resistance, the upper limitation of the content of S has been determined be about 0.020% from the perspective of costs required for desulfurization processing in steel making. The content of S is preferably equal to or greater than about 0.001% and equal to or less than about 0.01%.

Al: Content Equal to or Less Than About 1.0%

Al is a necessary component as a deoxidizing agent in steel making. There is the need to make addition of Al with a content of about 0.01% or more to obtain the effect. In the event that the content of Al exceeds about 1.0%, oxide type inclusions are readily generated, leading to deterioration of the toughness, so the upper limitation of the content of Al has been determined to be about 1.0%. Taking the workability and the deoxidizing effect into consideration, the content of Al is preferably equal to or greater than about 0.02% and equal to or less than about 0.1%.

V: Content Equal to or Greater Than About 0.03% and Equal to or Less Than About 0.3%

V (vanadium) improves the corrosion-resistance at HAZ. In the event that the content of V is less than about 0.03%, the effect is not manifested, and excessively high content of V exceeding about 0.3% leads to the steel being too hard. Accordingly, the content of V has been determined to be equal to or greater than about 0.03% and equal to or less than about 0.3%. Furthermore, V fixes C as carbide, and accordingly is an effective element for improvement of corrosion resistance, and softening. Taking the effects for improving the properties of the steel into consideration, the content of V is preferably equal to or greater than about 0.06% and equal to or less than about 0.15%.

C: Content Equal to or Less Than About 0.02%

N: Content Equal to or Less Than About 0.03%

C and N are elements having influence on the workability, corrosion-resistance, and toughness at they welded portions of the Fe—Cr alloy. In particular, in the event that C exceeds about 0.02% and N exceeds about 0.03%, deterioration of the corrosion resistance and hardening markedly occur, so the upper limitations thereof are determined. Also, when taking the properties at welded portions into consideration, both contents are preferably equal or less than about 0.005%.

Mo: Content Equal to or Less Than About 3%

Cu: Content Equal to or Less Than About 2%

Mo and Cu are effective elements for improving the corrosion resistance. Addition of each element of about 0.1% or more is required to obtain the effect. Note that both of Cu and Mo cause the Fe—Cr alloy to be hard, and also reduce the productivity of stainless steel, so an upper limitation of about 3% has been determined for Mo, and that of about 2% has been determined for Cu. The content of Mo is preferably about 2% or less, and the content of Cu is preferably about 0.5% or less, from the perspective of the workability and the corrosion resistance.

Ni: Content Equal to or Less Than About 9%

Ni is an effective element for improving the corrosion resistance. Ni is an austenite generating element, and an effective element for obtaining the martensite structure in high Cr-containing stainless steel. Addition of Ni of about 0.1% or more is required to obtain the effect. However, Ni is an expensive element, and in the event that the content of Ni increases, the sacrificial corrosion-resistant effect from zinc is not required, so the upper limitation of the content of Ni has been determined to be about 9%. Note that the content of Ni is preferably equal to or less than about 1% from the perspective of the workability and the corrosion resistance.

B: Content Equal to or Greater Than About 0.0003% and Equal to or Less Than About 0.005%

B is an effective element for improving secondary processing brittleness resistance. In particular, automobile underside members are formed and processed in complex shapes and forms, and furthermore, are often used in cold regions at a temperature below freezing. Furthermore, B is effective for improving the grain-boundary strength. The content of B is required to be equal to or greater than about 0.0003% to obtain the effect. Conversely, in the event that the content of B exceeds about 0.005%, deterioration in the workability and the toughness of the Fe—Cr alloy occurs, so the content of B has been determined to be equal to or greater than about 0.0003% and equal to or less than about 0.005%. The content of B is preferably equal to or greater than about 0.0005% and equal to or less than about 0.002%.

The Fe—Cr alloy for the automobile underside members according to the invention may contain Co, which is a component other than the components described above, with a content equal to or less than about 0.3% from the perspective of improvement of the secondary processing brittleness resistance. Furthermore, the Fe—Cr alloy may contain Zr of about 0.5% or less, Ca of about 0.1% or less, Ta of about 0.3% or less, W of about 0.3% or less, Sn of about 0.3% or less, and Mg of about 0.00320%, as unavoidable impurities, which do not particularly cause deterioration of the effects of the invention.

(13) Manufacturing Method for Fe—Cr Alloy for Automobile Underside Members

The manufacturing method for automobile underside members employed in the invention is not particularly restricted. A manufacturing method employed in manufacturing with ordinary steel may be employed in this embodiment without change. Description will now be made regarding an example of preferable manufacturing methods.

A steel material containing the aforementioned components with the aforementioned contents, which has been obtained by continuous casting, is heated to a predetermined temperature as necessary to be formed into hot-rolled sheets with a predetermined sheet thickness by hot rolling, following which the hot-rolled sheets are subjected to box annealing in the temperature range between about 600° C. and about 900° C., or are subjected to continuous annealing in the temperature range between about 800° C. and about 1100° C. according to the required strength level. Subsequently, the hot-rolled sheets are formed into manufactured products without additional prior processing, or following being subjected to pickling as necessary. Furthermore, the hot-rolled sheets after annealing are subjected to cold rolling with a predetermined sheet thickness, following which the cold-rolled sheets are subjected to continuous annealing preferably in the temperature range between about 700° C. and about 1050° C., and more preferably in the temperature range between about 700° C. and about 900° C., and are subjected to pickling, whereby cold-rolled steel sheets of Fe—Cr alloy are formed.

Note that the above-described method is only an example, and can be modified as appropriate.

(14) Composition of Ferritic Stainless Steel for Fuel Tanks and Fuel Tank Peripheral Members Description will be made below regarding ferritic stainless steel with preferable components and content (% by mass) for fuel tanks and fuel tank peripheral members according to the invention.

Cr: Content of About 11 to About 20%

Cr is an effective element for improving oxidation resistance and corrosion resistance. In the case of the content of Cr being less than about 11%, in the event that the steel is exposed with no paint applied in practical environments, red rust markedly occurs. Also, even in the event that the steel is coated with the paint, it is difficult to ensure sufficient corrosion resistance at gaps and end faces. A Cr content of about 11% or more is required to obtain sufficient oxidation resistance and corrosion resistance. On the other hand, in the event that the steel contains Cr with a content exceeding about 20%, the corrosion resistance of the steel itself is improved, so occurrence of red rust is not observed, and consequently, there is little need to apply the paint. And, even in the event of the r value being high, the workability is reduced due to the increase in strength, deterioration of ductility, or the like. Accordingly, the content of Cr is determined in the range between about 11% and about 20%. Furthermore, taking workability into consideration, the content of Cr is preferably determined in the range between about 12% and about 18%, and moreover, taking the corrosion resistance at welded portions into consideration, the content of Cr is preferably determined in the range between about 14% and about 18%.

C: Content of About 0.1% or Less

C strengthens grain boundaries and improves secondary processing brittleness resistance, so a content of about 0.0005% or more is required. In the event that the content of C is too great, precipitation of carbide formed from the C element occurs, leading to undesirable influence on the secondary processing brittleness resistance and grain boundary corrosion resistance. In particular, in the event that the content of C exceeds about 0.1%, the adverse effects markedly occur, so the upper limitation of about 0.1% is made. The content of C is preferably greater than about 0.002% and equal to or less than about 0.008% from the perspective of improvement of the secondary processing brittleness resistance.

Si: Content of About 1.0% or Less

Si is an effective element for improving oxidation resistance and corrosion resistance, so the steel preferably contains Si with a content of about 0.2% or more. On the other hand, in the event that the content of Si exceeds about 1.0%, brittleness of the steel occurs, leading to deterioration of the secondary processing brittleness resistance at welded portions, so the content of Si has been determined to be equal to or less than about 1.0%. A content of Si of about 0.75% or less is more preferable.

Mn: Content of About 1.5% or Less

Mn is an effective element for improving oxidation resistance, so the content of Mn of about 0.5% or more is preferable. However, in the event of the content of Mn being excessively high, deterioration of the toughness of the steel is caused, and furthermore, deterioration of secondary processing brittleness resistance at welded portions is caused. Accordingly, the content of Mn has been determined to be equal to or less than about 1.5%. The content of Mn of about 1.30% or less is preferable.

P: Content of About 0.06% or Less

P is an element wherein segregation of P readily occurs at grain boundaries, and the strength of the grain boundaries is reduced following great deformation such as deep-drawing formation for fuel tanks or the like. Accordingly, the content of P is desirably reduced as possible to improve the secondary processing brittleness resistance (the resistance as to the phenomenon wherein cracks are caused due to slight impact following great deformation). However, the strict restriction of the content of P leads to an increase in the cost of steel making. Accordingly, the content of P is determined to be equal to or less than about 0.06%. The content of P of about 0.03% or less is more preferably determined.

S: Content of About 0.03% or Less

S is an undesirable element regarding corrosion resistance of the stainless steel. However, taking the costs for desulfurization in steel making into consideration, the content of S of about 0.03% is permitted as the upper limitation. The content of S of about 0.01% or less is preferable, which can be realized by fixing with Mn or Ti.

Al: Content of About 1.0% or Less

Al is a necessary element as a deoxidizing agent in steel making. Addition of Al with a content of about 0.01% or more is required to obtain the effect. However, in the event that the steel contains Al with an excessively high content, deterioration of appearance of the surface or deterioration of corrosion resistance are caused due to inclusions, so the content of Al is determined to be equal to or less than about 1.0%. The content of Al of about 0.50% or less is more preferably determined.

N: Content of About 0.04% or Less

N strengthens the grain boundaries and improves the secondary processing brittleness resistance of the steel subjected to formation into a tank or the like. Addition of N with content of about 0.0005% or more is required to obtain the effect. In the event that the steel contains N with an excessively high content, precipitation of nitrides is caused at the grain boundaries, leading to harmful influence on the corrosion resistance. Accordingly, the content of N has been determined to be equal to or less than about 0.04%. A more preferable content is about 0.020% or less.

Nb: Content of About 0.01% to About 0.8%

Ti: Content of About 0.01% to About 1.0%

Nb and Ti are elements which improve the r value by fixing C and N in the solution state as compounds. Due to addition of either or both of Nb and Ti with each content of about 0.01% or more, these effects become apparent. Conversely, in the event that the content of Nb exceeds about 0.8%, deterioration of the toughness markedly occurs. Furthermore, in the event that the content of Ti exceeds about 1.0%, deterioration of the appearance of the surface and deterioration of the toughness are caused, so the upper limitations has been determined to be these values. The content of Nb is more preferably in the range between about 0.05% and about 0.4%, and the content of Ti is more preferably in the range between about 0.05% and about 0.40%.

Mo: Content of About 3.0% or Less

Mo is an effective element for improving corrosion resistance, and improves surface-corrosion resistance to salt damage. Accordingly, the content of Mo is preferably determined to be equal to or greater than about 0.5%. However, in the event that the content of MO exceeds about 3.0%, deterioration of workability is caused. Accordingly, the content of Mo is determined to be equal to or less than about 3.0%. The content of Mo is preferably determined in the range between about 0.5% and about 1.6% from the perspective of the workability and corrosion resistance.

Ni: Content of About 2.0% or Less

Ni is an element for improving corrosion resistance of the stainless steel, and a content of about 0.2% or more is preferable. In the event that the content of Ni exceeds about 2.0%, the steel becomes hard, and also stress corrosion cracking readily occurs due to the austenite phase being caused. Accordingly, the content of Ni has been determined to be equal or less than about 2.0%. The content of Ni is more preferably in the range between about 0.2% and about 0.8%.

Cu: Content of About 2.0% or Less

Cu is an effective element for improving the corrosion resistance. Addition of Cu with a content of about 0.05% or more is required to obtain the effect. The productivity is reduced accompanying hardening of the steel, so the upper limitation of the content of Cu has been determined to be about 2.0%. The content of Cu is preferably determined to be less than about 0.5% from the perspective of the workability and the corrosion resistance.

B: Content of About 0.0003% to About 0.005%

B is an effective element for improving secondary processing brittleness resistance. In particular, complex formation processing is needed for the fuel tank peripheral members, and are often used in cold regions at a temperature below the freezing point. Furthermore, B is effective for improving the strength of grain boundaries. A content of B of about 0.0003% or more is required to obtain the effect. Conversely, a content greater than about 0.005% leads to deterioration of the workability and toughness of the steel, so the content of B has been determined in the range between about 0.0003% and about 0.005%. The content of B is preferably in the range between about 0.0005% and about 0.0010%.

The stainless steel of the invention may contain Co with a content of about 0.3% or less, which is a component other than the above-described components, from the perspective of improvement of the secondary processing brittleness resistance.

Furthermore, the stainless steel may contain Zr of about 0.5% or less, Ca of about 0.1% or less, Ta of about 0.3% or less, W of about 0.3% or less, Sn of about 0.3% or less, and Mg of about 0.00320% or less, as unavoidable impurities, which does not particularly cause deterioration of the effects of the present invention.

(15) Manufacturing Method for Ferrtic Stainless Steel for Fuel Tanks and the Peripheral Members Thereof While the ferritic stainless steel for fuel tanks and the peripheral members thereof according to the invention can be manufactured by applying a general manufacturing method for ferritic stainless steel without change, a part of the conditions for hot-rolling processing and cold-rolling processing are preferably optimized. In steel making, the steel containing the above-described necessary components and components which have been added as necessary is preferably subjected to melting with a steel converter, electric furnace, or the like, and is preferably subjected to secondary refining with the VOD method. While the molten steel subjected to melting can be formed into a steel material according to a known manufacturing method, the molten steel is preferably formed into a steel material according to continuous casting from the perspective of the productivity and the quality. The steel material obtained by continuous casting is heated up to about 1000° C. to about 1250° C., for example, to be formed into hot-rolled steel sheets with a predetermined sheet thickness using hot rolling machine. The steel may be formed into a steel material other than a steel sheet.

The obtained hot-rolled steel sheets are subjected to box annealing in the temperature range between about 600° C. and about 900° C., or are subjected to continuous annealing (hot-rolled sheet annealing) in the temperature range between about 800° C. and about 1100° C., and preferably in the temperature range between about 900° C. and about 1100° C., according to the required strength level, following which the hot-rolled steel sheets are subjected to pickling and cold rolling, whereby cold-rolled steel sheets are obtained. In the cold rolling process, due to the limits of productivity, two or more cold rolling processes including intermediate annealing may be performed as necessary. In this case, the linear pressure of the last pass of the aforementioned hot rolling should be secured, and also the total rolling reduction of the cold rolling process made up of one or more cold rolling processes should be set to about 75% or more, and preferably set to about 82% or more to obtain steel sheets with a high r value.

The cold rolled steel sheets are subjected to continuous annealing (cold rolled sheet annealing) in the temperature range between about 700° C. and about 1050° C., and preferably in the temperature range between about 850° C. and about 1000° C., following which the cold rolled steel sheets are subjected to pickling, whereby cold rolled steel sheets are formed. Furthermore, the cold rolled steel sheets may be subjected to slight rolling following cold rolling annealing, to adjust the shape and quality of the steel sheets as appropriate. The paint is applied to the cold rolled steel sheets or the cold rolled steel sheets subjected to quality adjustment.

FIRST EMBODIMENT
(TABLES 1 THROUGH 4)

Fe—Cr alloy cold rolled annealed steel sheet (sheet thickness of 0.8 mm) containing four components shown in Table 1 was subjected to press formation into two L-shaped test pieces (width of 80 mm, long side of 150 mm, and short side of 50 mm) as shown in FIG. 1A. The two test pieces were made facing one to another so that the faces made up of the short sides (width of 80 mm and short side of 50 mm) of the two test pieces were pressed into contact against each other, and were subjected to seam welding (seam welded portion 7) taking the point of 20 mm from the top of the facing faces as the center point, whereby a test piece 1 was prepared. The entire face of the test piece 1 was subjected to spray application with corrosion-resistant paint (with binder of epoxy resin, and hardening agent of room temperature setting hardening agent) containing zinc with an average particle diameter shown in Table 2 through Table 4, and with ratio shown in Table 2 through Table 4 in the condition of a dry paint film so that a paint film was formed with an average dry film thickness shown in Table 2 through Table 4. Subsequently, the test piece 1 was left for one hour as it was for drying, whereby the paint film was curred.

The particle diameter of the metal powder is defined as a value wherein the sum of the measured maximal and minimal particle diameters of one metal particle is divided by 2. The average particle diameter was obtained by the procedures wherein following application of the paint, the cross-section of a dry paint film was observed under a microscope, magnified at 400 times for the five views to obtain the particle diameters of each metal powder for all the particles in the views according to the above-described procedures, and the obtained particle diameters were averaged.

The measurement of thickness of a dry paint film was performed by the procedures wherein following application of the paint, the cross-section of the dry paint film was observed under a magnification of 400 times for five each view so that three film thicknesses were measured at three portions for each view, and the average film thickness was obtained by averaging the measured film thicknesses for each view, and furthermore, the averaged thicknesses were averaged for all the five views. Furthermore, the content of zinc powder in a dry paint film (percentage by volume) was obtained by the procedures wherein following application of the paint, the cross-section of a dry paint film was observed with a microscope under magnification of 400 times for the five views, and the observed images were subjected to image processing by a computer. The content (percentage by volume) obtained in each embodiment was calculated by averaging five contents (percentage by volume) obtained from these five views.

Next, the portion 2 where the end faces of the two test pieces face one to another was capped with a plastic clip 3 to form a gap as shown in FIG. 1A.

Figure 1B:
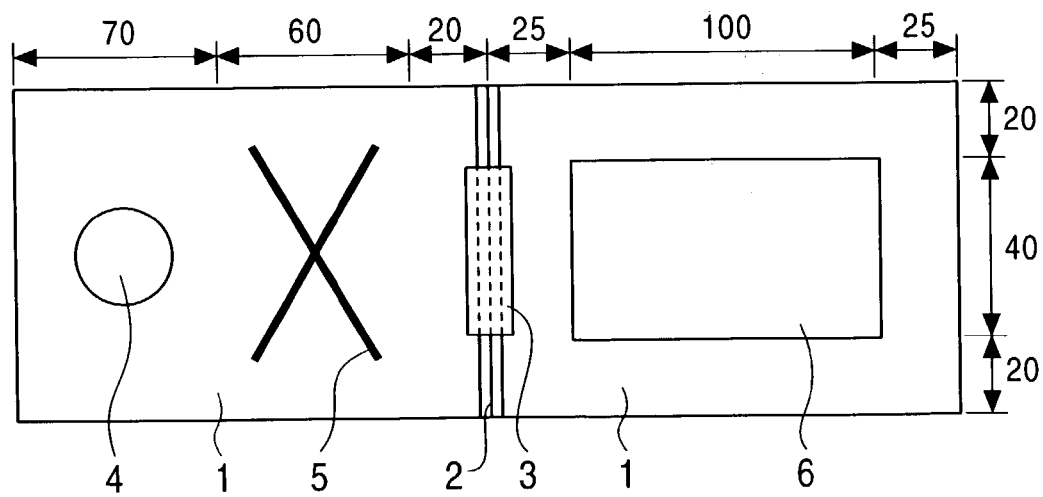

A dome-shaped protrusion 4 with a height of 8 mm was provided on the outside on the surface of the test piece 1 by circular dome formation using a punch with a diameter of 10 mm and a height of 8 mm conforming to "Erichsen tester and testing methods" stipulated by JIS B7729 and JIS B7777, as shown in FIG. 1A and FIG. 1B.

As shown in FIG. 1B, a cross-shaped cut 5 was made along the diagonals with lengths of 115 mm within a rectangle with a length of 60 mm and a width of 80 mm at a position of 25 mm from the both ends of the diagonals on the outside of the surface of the test piece 1. The length of the cross-shaped cut was 65 mm.

A gravel portion 6 where scratches were formed due to scattering stones (chipping) was provided on a rectangle 6 shown in FIG. 1B by scattering basalt (crushed stones) of 100 g onto the outside of the surface of the test piece 1 from the direction perpendicular to the surface with a pressure of 7 kgf/cm$^2$ at room temperature. Note that the gravel portion 6 was formed using an apparatus conforming to the ASTM D3170.

The corrosion resistance of the test piece was evaluated by the salt water spray test (SST) at the gap (plastic clip), the Erichsen portion, the cross-shaped cut portion, and the gravel portion. The SST was performed conforming to JIS Z 2371. The test time period for the SST was 6000 hours. Occurrence of rust was visually observed so as to be classified into five grades as described below. The results are shown in Tables 2 through 4.

| | | |
|---|---|---|
| 5: | no rust | Accepted |
| 4: | slight stain rust (dot rust with a diameter of 1 mm or less) | Accepted |
| 3: | stain rust (dot rust with a diameter greater than 1 mm) | Accepted |
| 2: | slight red rust (dot rust with a diameter of 1 mm or less) | Rejected |
| 1: | red rust (dot rust with a diameter greater than 1 mm) | Rejected |

Furthermore, the paint film adhesion of the test piece following evaluation for corrosion-resistance was evaluated by being classified into three ranks of A through C, from the results obtained from the experiment wherein following putting commercially-available cellophane tape on the cross-shaped cut portion and the gravel portion, the tapes were peeled.

| | | |
|---|---|---|
| A: | no peeling | Accepted |
| B: | partial peeling | Rejected |
| C: | entire peeling | Rejected |

With regard to No. 1 in Table 2, No. 16 in Table 3, and No. 29 in Table 4, the content of zinc by volume is less than 10%, and accordingly, the corrosion resistance is insufficient, and each example (comparative examples) is rejected. With regard to No. 6 through No. 7 in Table 2, No. 21 through No. 22 in Table 3, and No. 34 through No. 35 in Table 4, the content of zinc by volume is equal to or greater than 60%, the paint film adhesion following the SST evaluation is reduced, so the paint film peels, and accordingly, each example (comparative examples) is rejected.

Both samples of No. 8 in Table 2 and No. 23 in Table 3 are naked materials with no corrosion-resistant paint being applied, and accordingly, the corrosion resistance is sufficient, and each example (reference examples) is rejected. The samples of No. 36 and No. 37 in Table 4 are comparative steels with a content of Cr less than 6.0% (steel 4 shown in Table 1), and accordingly, even in the event that application of the corrosion-resistant paint is made under suitable conditions, the corrosion-resistance is insufficient, so each example (comparative examples) is rejected.

Both samples of No. 12 and No. 13 in Table 2 and No. 27 and No. 28 in Table 3 have paint films with thicknesses greater than 60 μm, and accordingly, the paint films easily peel in the Erichsen test and the gravel test, leading to deterioration of corrosion-resistance, so each example (comparative examples) is rejected.

On the other hand, all the samples of No. 2 through No. 5, No. 9 through No. 11, and No. 14 through No. 15 in Table 2, No. 17 through No. 20, and No. 24 through No. 26 in Table 3, and No. 30 through No. 33 in Table 4 satisfy the conditions according to the invention (content of Cr, zinc average particle diameter, zinc content by volume, film thickness), and high corrosion resistance is observed at any portion of the gaps, the Erichsen portion, the gravel portion, and the cross-shaped cut portion, and furthermore, peeling of the paint film does not occur in the Erichsen test and the gravel test, so each example (examples of the present embodiment) is accepted.

Figure 2:
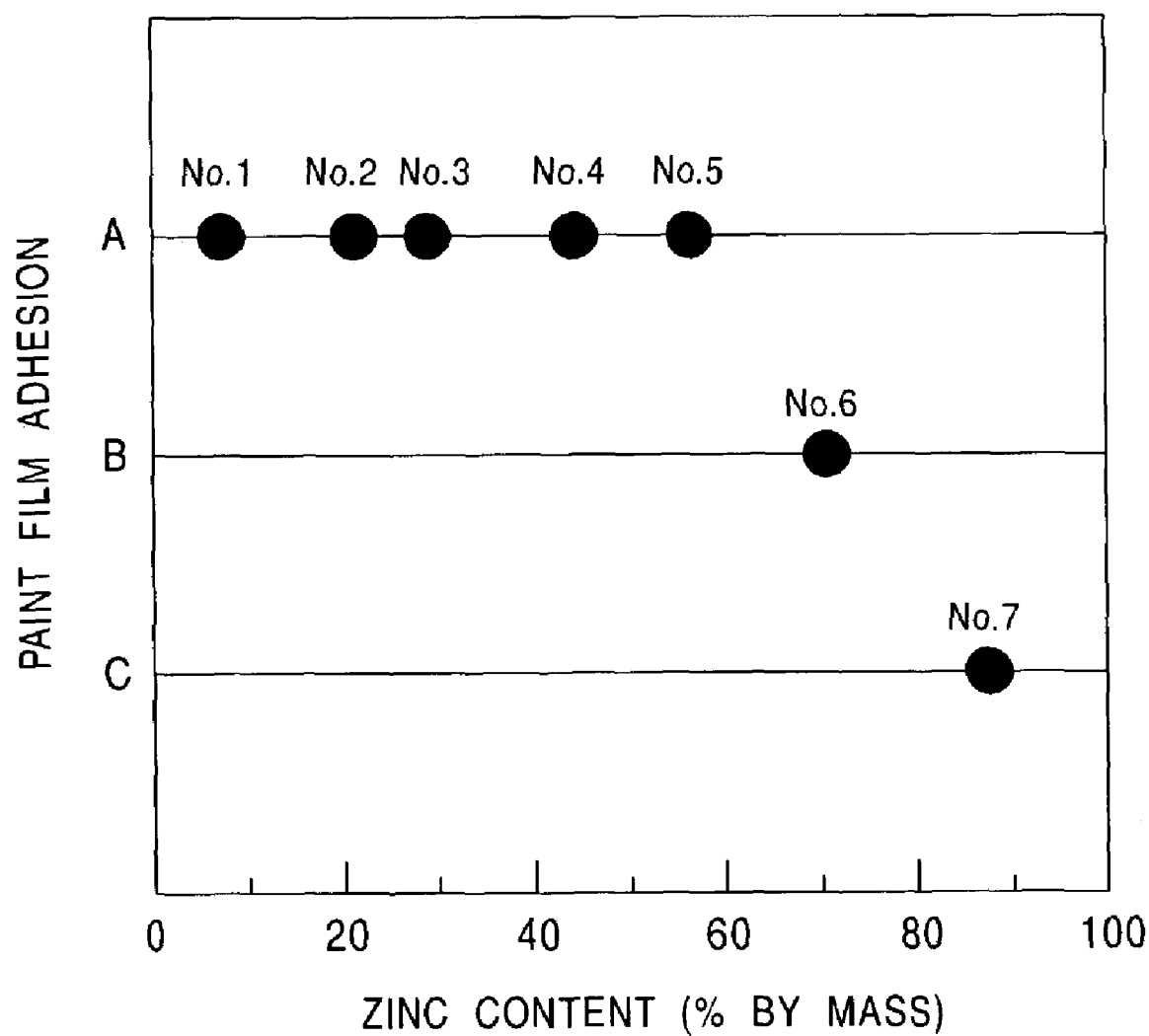
FIG. 2 is a graph illustrating the relation between paint film adhesion and the amount of zinc contained in the corrosion preventing film in terms of percent by mass.

FIG. 2 illustrates the relation between the adhesion of the corrosion-resistant paint film on the gravel portion and the content of zinc by volume in the corrosion-resistant paint film of samples of No. 1 to 7 in Table 2. As shown in FIG. 2, it is apparent that the adhesion of the paint film is excellent in the event that the content of zinc by volume is small.

SECOND EMBODIMENT (TABLES 5 THROUGH 8)

Fe—Cr alloy cold rolled annealed steel sheet (sheet thickness of 0.8 mm) containing nine components shown in Table 5 is formed into two L-shaped test pieces (width of 80 mm, long side of 150 mm, and short side of 50 mm) as shown in FIG. 1. The two test pieces are subjected to seam welding, taking the point of 20 mm from the top of the face (width of 80 mm and short side of 50 mm) made up of the short sides of the two test pieces as a center point, whereby a test piece is prepared. The entire face of the test piece was subjected to spray application with corrosion-resistant paint (with binder of epoxy resin, and hardening agent of room temperature setting hardening agent) containing zinc with a content in a dry paint film shown in Table 2 so that a paint film was formed with an average dry film thickness shown in Table 6 through Table 8. Subsequently, the test piece was left for one hour as it is for drying, whereby the paint film was curred. Measurement of the film thickness of a dry paint film and average particle diameter of zinc metal powder was performed in the same way as with the first embodiment. Description will be made below regarding the procedures for obtaining zinc particle content (percentage by mass) in a dry paint film. First, the weight of the steel (W1) was measured with a dry paint film being coated thereupon, following which the steel plate and the paint film were separated using paint film remover (NEORIVER (phonetic spelling)), the steel plate was dried and the weight of the dry steel plate (W2) was measured. Subsequently, the removed paint film was dissolved using sulfuric acid or perchloric acid so that the solution was analyzed with the atomic absorption method, whereby the quantity of zinc (W3) was obtained. The zinc-particle content can be obtained with the expression W3/(W1-W2).

Next, the portion 2 where the end faces of the two test pieces face one to another was capped with a plastic clip 3 to form a gap.

To evaluate the paint film on a press-formed portion of the test piece, a dome-shaped protrusion 4 with a height of 8 mm was provided using, a punch with a diameter of 10 mm and a height of 8 mm conforming to "Erichsen tester and testing methods" stipulated by JIS B7729 and JIS B7777, as shown in FIG. 1A and FIG. 1B, and an evaluation was performed.

To evaluate the adhesion of the test piece to the paint film, a cross-shaped cut was made along the diagonals with lengths of 115 mm within a rectangle with a length of 60 mm and a width of 80 mm at a position of 25 mm from the both ends of the diagonals, as shown in FIG. 1B.

To evaluate the adhesion of the test piece against impacts, a gravel portion 6 where scratches have been formed due to scattering stones (chipping) was provided on the surface of the plate by impacting basalt (crushed stones with an average particle diameter of 8 to 12 mm) of 100 g onto the outside of the surface of the test piece 1 from a direction perpendicular to the surface with a force of 7 kgf/cm$^2$ at room temperature. Note that the gravel portion 6 was formed using an apparatus conforming to ASTM D3170.

Evaluation of the adhesion to the paint film and corrosion resistance at gaps (plastic and backside) against impact from the outside or the like such as scattering stones or scratches was performed for the evaluation of corrosion resistance following application of paint to the test pieces at the gaps, and evaluation of corrosion resistance at gaps formed with the plate being in contact with a different material.

Figure 7:
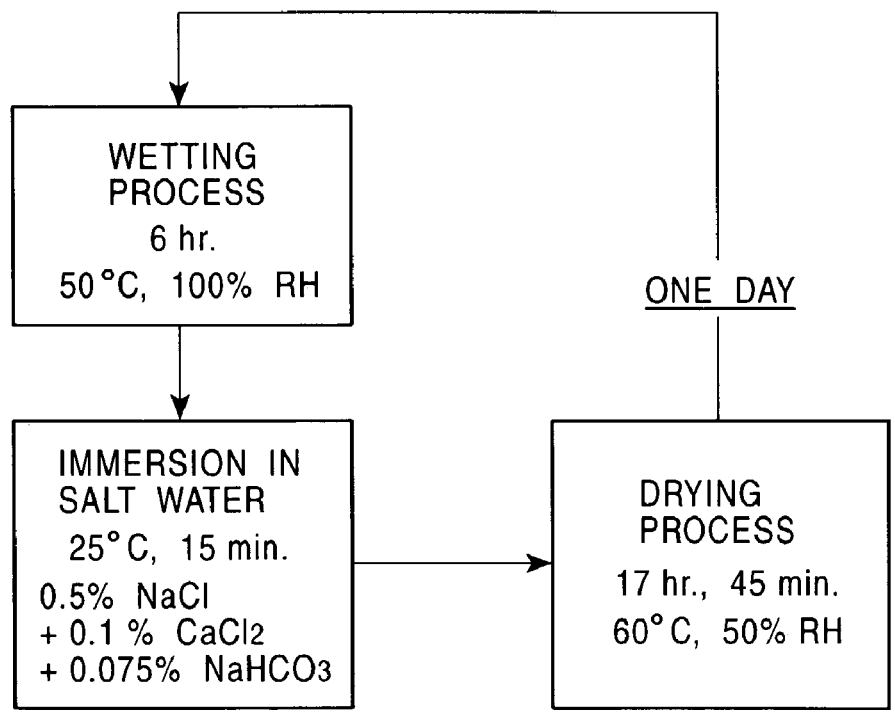
FIG. 7 is a diagram illustrating the flow of salt-dry-wet combined cycle testing on the testing member, and testing conditions thereof.

The corrosion resistance at the gaps of the test piece was evaluated with the salt-dry-wet combined cycle testing (CCT) conforming to SAE (American Society of Automotive Engineers) J2334. The CCT was performed under condition that the cycle shown in FIG. 7 was performed for 120 cycles, taking use for 15 years in the North American Snow Belt into consideration. Subsequently, occurrence of rust was visually observed and classified into five grades in the same way as the first embodiment. The results obtained from each test are shown in Tables 6 through 8.

The samples of No. 34 through No. 38 in Table 8 are examples wherein the content of Cr is less than 6% by mass, and the corrosion resistances of all the samples were insufficient.

The samples of No. 14 in Table 6, No. 29 in Table 7, and No. 38 in Table 8 are comparative examples wherein commercially-available zinc-rich paint containing zinc with a content of 80% by mass has been applied, and the paint films of all the samples easily peeled in the gravel test. Thus, the overall evaluation for each sample is rejected.

The samples of No. 1 through No. 3, No. 6 through No. 7, and No. 15 through No. 16 in Table 6, No. 18 through No. 19, No. 21 through No. 23, No. 25 through No. 26, and No. 30 through No. 32 in Table 7 are comparative examples wherein the content of zinc in the paint film is less than the limitation of 70−{2.7×(Cr+3.3 Mo)} according to the invention. The corrosion resistances of these samples are poor. Thus, each sample is rejected.

The sample of No. 51 in Table 8 is a comparative example with an excessively thick film, and the paint films of all the samples easily peeled in the Erichsen test and the gravel test, and deterioration of corrosion resistance occurred.

On the other hand, all the samples of No. 4 through No. 5, No. 8 through No. 13, and No. 17 in Table 6, No. 20, No. 24, No. 27 through No. 28, and No. 33 in Table 7, and No. 39 through No. 51 in Table 8 satisfy conditions according to the invention. Peeling of the paint film did not occur in the Erichsen test and the gravel test, and high corrosion resistance is generally observed.

THIRD EMBODIMENT
(TABLED 9 THROUGH 12)

Figure 4A:
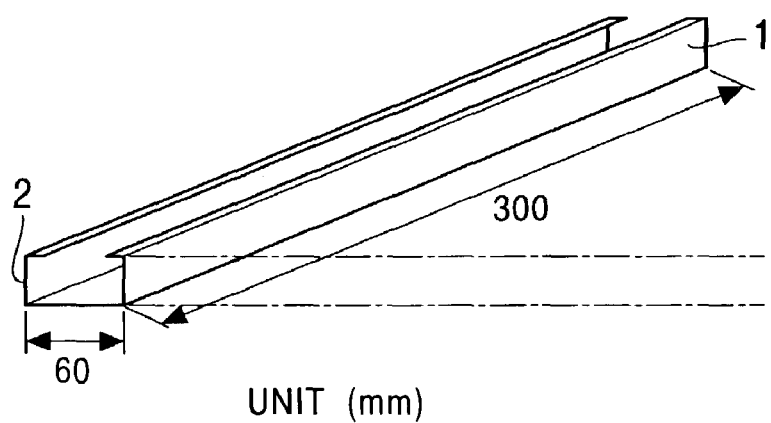
FIG. 4A is a layout drawing of the shape of a testing piece.
Figure 4B:
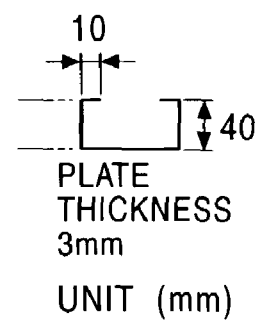
FIG. 4B is a side view of the layout of the shape of a testing piece.

Five kinds of stainless steel with compositions shown in FIG. 9 were formed by continuous casting, and hot rolled steel sheets (sheet thickness of 3 mm) were manufactured under normal hot-rolling conditions. The hot rolled sheets were subjected to annealing at 700° C. for eight hours following which the hot rolled sheets were subjected to pickling, and then press-formed into a test member (length of 300 mm, width of the bottom face of 60 mm, height of 40 mm, and width of the top face of 10 mm) in a cross-sectional shape shown in FIG. 4B.

Figure 5A:
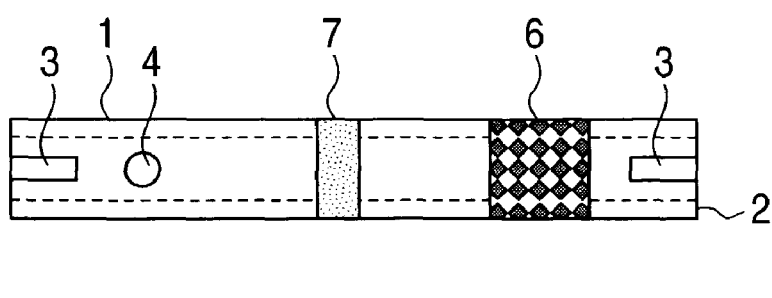
FIG. 5A is an explanatory diagram illustrating pre-processing performed for evaluating corrosion resistance and the like on the outer surface of the testing member.
Figure 5B:
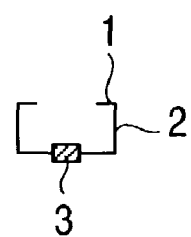
FIG. 5B is a side view illustrating pre-processing performed for evaluating corrosion resistance and the like on the outer surface of the testing member.

Next, the entire face of the test member was subjected to spray application with paint (with binder of epoxy resin, and hardening agent of room temperature setting hardening agent) containing zinc with a content in a dry paint film shown in Tables 10 through 12 so that a paint film was formed with an average dry film thickness shown in Tables 10 through 12. Subsequently, the test member was left for one hour for drying, and the paint film was curred, whereby the test member 1 formed of stainless steel applied with zinc-containing paint was obtained. The test member 1 was subjected to formation and processing for measuring corrosion resistance or the like as described below, whereby the test member 1 having a configuration shown in FIG. 5. Measurement of thickness of a dry paint film, the content of zinc metal powder, and the average particle diameter was performed in the same way as the first and second embodiments.

The surface of the test member 1 (with application of zinc-containing paint) was capped with two plastic clips 3 to form a gap between plastic and metal.

A through hole 4 (without application of paint) was provided on the bottom face of the test member 1 using a punch with a diameter of 15 mm and a height of 8 mm conforming to "Erichsen tester and testing methods" stipulated by JIS B7729 and JIS B7777.

A gravel portion 6 is provided on the bottom face (width of 60 mm and height of 80 mm) by impacting basalt (crushed stones with an average particle diameter of 8 to 12 mm) of 100 g onto the bottom face at a direction perpendicular to the surface with a force of 7 kgf/cm$^2$ at room temperature of 20° C. to create scratches on the bottom face due to scattering stones. The gravel portion 6 was formed using an apparatus conforming to ASTM D3170.

The end face 2 (without application of zinc-containing paint) of the test member 1 in the long side direction was subjected to TIG welding.

Figure 6:
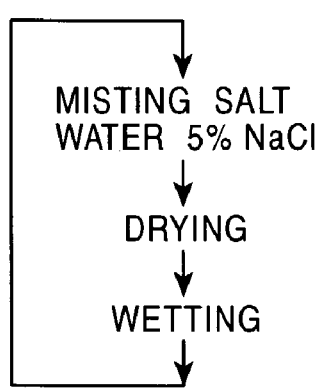
FIG. 6 is a diagram illustrating the flow of salt-dry-wet combined cycle testing on the testing member, and testing conditions thereof.

Next, occurrence of rust was visually observed for the gravel portion 6 due to the gravel test (at room temperature), the through hole 4 with a diameter of 15 mm, the gap due to the plastic clip 3, the end face 2, and the TIG welded portion 7 following the cycle shown in FIG. 6 being repeated for 120 cycles in the salt-dry-wet combined cycle testing (CCT) to evaluate the corrosion resistance (corrosivity) by being classified into five grades in the same way as the first embodiment. The results are shown in Tables 10 through 12.

In the event that the test member 1 had two or more unsatisfactory portions, the overall evaluation is rejected.

In the above-described evaluation test, the gravel test was performed for evaluating adhesion to paint and corrosion resistance against impact from the outside such as scattering stones, scratches, or the like. The gap evaluation was performed to evaluate corrosion resistance at gaps formed in manufacturing a processed member, or at gaps formed by a different member being in contact with the processed member.

FOURTH EMBODIMENT (TABLES 13 THROUGH 16)

Nine kinds of stainless steels with compositions shown in Table 13 were formed by continuous casting, and hot rolled sheets (sheet thickness of 5.0 mm) were manufactured under normal hot-rolling conditions. The hot rolled sheets were subjected to continuous annealing at 980° C. for one hour following which the hot rolled sheets were subjected to pickling, subjected to cold rolling to a sheet thickness of 2.3 mm, and following process annealing at 900° C. and pickling, the sheets were subjected to cold rolling up to a sheet thickness of 0.8 mm, and subjected to finishing annealing at 920° C. and pickling, whereby cold rolling annealed sheets were obtained.

The cold rolled annealed sheet was subjected to press formation into L-shaped test pieces 1 (width of 80 mm, long side of 150 mm, and short side of 50 mm) as shown in FIG. 1A. The two test pieces were subjected to seam welding, taking the point of 20 mm from the top of the face (width of 80 mm and short side of 50 mm) formed of short sides of two test pieces as the center point, whereby a test piece having the welded portion 7 was prepared. The entire face of the test piece 1 was subjected to spray application of zinc-containing paint with a content of zinc in a dry paint film shown in Table 14 through 16 so that a paint film was formed with an average dry film thickness shown in Table 14 through 16. Subsequently, the test piece 1 was left for one hour for drying, and the paint film was stiffened, whereby the test piece 1 formed of zinc-containing paint applied stainless steel was obtained.

Measurement of thickness of a dry paint film, the content of zinc metal powder, and the average particle diameter was performed in the same way as the first and second embodiments.

Next, the portion where the end faces of the two test pieces face one to another was capped with a plastic clip 3 to form a gap.

Description will be made below regarding formation and processing performed for test piece 1 to measure the corrosion resistance and so forth.

For corrosion resistance at gaps, evaluation was made with the surface (with application of paint) of the test piece 1 being capped with the plastic clip 3 to form a gap between the plastic and the metal.

For the Erichsen test, a dome-shaped protrusion 4 with a height of 8 mm was provided on the surface of the bottom face of the test piece 1 using a punch with a diameter of 15 mm and a height of 8 mm conforming to "Erichsen tester and testing methods" stipulated by JIS B7729 and JIS B7777, as shown in FIG. 1A and FIG. 1B.

For the cross-cut test, a cross-shaped cut was made along the diagonals with lengths of 115 mm within a rectangle with a length of 60 mm and a height of 80 mm at a position of 20 mm from the both ends of the diagonals on the surface of the bottom face of the test piece 1 as shown in FIG. 1B.

For the gravel test, a gravel portion 6 was provided by impacting basalt (crushed stones with an average particle diameter of 8 to 12 mm) of 100 g onto the surface of the bottom face of the test piece 1 (width of 40 mm and length of 100 mm) from a direction perpendicular to the bottom face with a force of 7 kgf/cm$^2$ at room temperature of 20° C. to form scratches on the surface of the bottom face. The gravel portion 6 was formed using an apparatus conforming to ASTM D3170.

Next, occurrence of rust was visually observed for the gravel portion 6 due to the gravel test (at room temperature), the protrusion 4 with a diameter of 15 mm, and the gap 2 due to the plastic clip 3, following the cycle shown in FIG. 3 being repeated for 120 cycles in the salt-dry-wet combined cycle testing (CCT) conforming to SAE J2334 to evaluate the corrosion resistance (corrosivity) by being classified into five grades in the same way as the first embodiment. The results are shown in Tables 14 through 16.

In the event that the test member 1 had two or more unsatisfactory portions, the overall evaluation is rejected.

For evaluating workability, the tensile test was performed using JIS 13B test piece conforming to JIS Z2254, and evaluation was made with the r value which is an index of deep drawability, and with elongation E1 which is an index of punch stretch formability conforming to JIS Z2254.

Furthermore, the test piece was subjected to cylindrical deep drawing under conditions with a punch diameter of 33 mm and a blank diameter of 70 mm, following which the presence or absence of cracking was observed.

Moreover, corrosion test was performed wherein the aforementioned deep drawing processed test piece was soaked in deteriorated gasoline containing formic acid of 1200 ppm and acetic acid of 450 ppm for twenty days, following which the appearance of the surface was observed, and the weight was measured. The samples with changes in weight of 0.05g/m$^2$ or less and without red rust in appearance were judged to be acceptable, whereas the samples other than the aforementioned samples were judged to be unacceptable.

The obtained results are shown in Tables 14 through 16 in a summarized manner. As a result, it can be found that all the invention examples not only have excellent surface-corrosion resistance, particularly in salty environments, but also have excellent workability due to reduction of alloy elements, and furthermore, have sufficient corrosion resistance in deteriorated gasoline.

TABLE 1

| No. | C (% by mass) | Si (% by mass) | Mn (% by mass) | P (% by mass) | S (% by mass) | Cr (% by mass) | Ni (% by mass) | Mo (% by mass) | Cu (% by mass) | Nb (% by mass) | Ti (% by mass) | N (% by mass) | Remarks |
|---|---|---|---|---|---|---|---|---|---|---|---|---|---|
| 1 | 0.004 | 0.06 | 0.15 | 0.025 | 0.005 | 17.80 | 0.001 | 1.200 | 0.002 | 0.001 | 0.270 | 0.007 | Present Invention Steel |
| 2 | 0.012 | 0.20 | 1.500 | 0.030 | 0.006 | 10.95 | 0.300 | 0.001 | 0.330 | 0.001 | 0.001 | 0.007 | Present Invention Steel |
| 3 | 0.012 | 0.30 | 1.300 | 0.020 | 0.005 | 9.10 | 0.400 | 0.100 | 0.200 | 0.001 | 0.001 | 0.009 | Present Invention Steel |
| 4 | 0.018 | 0.22 | 1.300 | 0.020 | 0.005 | 5.60 | 0.250 | 0.050 | 0.150 | 0.001 | 0.001 | 0.009 | Comparative Example Steel |

TABLE 2

| | | Paint film | | | | Corrosion-resistance | | | Paint film adhesion | | | |
|---|---|---|---|---|---|---|---|---|---|---|---|---|
| No. | Steel No. in Table 1 | Zn content (% by volume) | Zn average particle diameter (μm) | Average dry film thickness (μm) | Erichsen | Cross-shaped cut | Gravel | Gap | Cross-shaped cut | Gravel | Overall Evaluation | Remarks |
| 1 | 1 | 8.1 | 1.9 | 24.6 | 5 | 4 | 1 | 2 | A | A | Rejected | Comparative Example |
| 2 | 1 | 22.1 | 2.0 | 24.8 | 5 | 5 | 4 | 3 | A | A | Accepted | Invention |
| 3 | 1 | 29.4 | 1.9 | 24.5 | 5 | 5 | 5 | 4 | A | A | Accepted | Invention |
| 4 | 1 | 44.6 | 2.2 | 25.3 | 5 | 5 | 5 | 5 | A | A | Accepted | Invention |
| 5 | 1 | 56.3 | 2.0 | 25.4 | 5 | 5 | 5 | 5 | A | A | Accepted | Invention |
| 6 | 1 | 70.3 | 1.9 | 24.6 | 5 | 5 | 4 | 5 | B | B | Rejected | Comparative Example |
| 7 | 1 | 88.1 | 2.0 | 25.1 | 5 | 5 | 3 | 5 | C | C | Rejected | Comparative Example |
| 8 | 1 | 0 | — | 0 | 3 | 3 | 2 | 2 | — | — | Rejected | Reference Example |
| 9 | 1 | 44.7 | 2.0 | 4.6 | 5 | 5 | 4 | 4 | A | A | Accepted | Invention |
| 10 | 1 | 46.2 | 2.3 | 30.1 | 5 | 5 | 5 | 5 | A | A | Accepted | Invention |
| 11 | 1 | 47.6 | 1.9 | 70.3 | 5 | 5 | 5 | 5 | A | A | Accepted | Invention |
| 12 | 1 | 45.5 | 2.1 | 110.3 | 5 | 5 | 5 | 5 | B | B | Rejected | Comparative Example |
| 13 | 1 | 45.3 | 2.3 | 149.8 | 4 | 5 | 4 | 5 | C | C | Rejected | Comparative Example |
| 14 | 1 | 44.9 | 4.2 | 24.6 | 5 | 4 | 4 | 5 | A | A | Accepted | Invention |
| 15 | 1 | 50.1 | 7.1 | 24.8 | 4 | 4 | 4 | 4 | A | A | Accepted | Invention |

TABLE 3

| No. | Steel No. in Table 1 | Paint film | | | Corrosion-resistance | | | | Paint film adhesion | | Overall Evaluation | Remarks |
|---|---|---|---|---|---|---|---|---|---|---|---|---|
| | | Zn content (% by volume) | Zn average particle diameter (μm) | Average dry film thickness (μm) | Erichsen | Cross-shaped cut | Gravel | Gap | Cross-shaped cut | Gravel | | |
| 16 | 2 | 8.0 | 2.0 | 24.9 | 3 | 3 | 2 | 2 | A | A | Rejected | Comparative Example |
| 17 | 2 | 22.4 | 2.0 | 25.4 | 4 | 4 | 4 | 4 | A | A | Accepted | Invention |
| 18 | 2 | 28.8 | 2.2 | 24.7 | 5 | 5 | 4 | 5 | A | A | Accepted | Invention |
| 19 | 2 | 44.6 | 2.2 | 25.1 | 5 | 5 | 5 | 5 | A | A | Accepted | Invention |
| 20 | 2 | 56.1 | 2.1 | 25.0 | 5 | 5 | 5 | 5 | A | A | Accepted | Invention |
| 21 | 2 | 70.2 | 2.0 | 25.1 | 3 | 4 | 4 | 5 | B | B | Rejected | Comparative Example |
| 22 | 2 | 88.1 | 1.7 | 24.9 | 2 | 4 | 4 | 5 | C | C | Rejected | Comparative Example |
| 23 | 2 | 0 | — | 0 | 3 | 3 | 2 | 2 | — | — | Rejected | Reference Example |
| 24 | 2 | 44.9 | 2.0 | 4.9 | 5 | 4 | 4 | 4 | A | A | Accepted | Invention |
| 25 | 2 | 46.0 | 2.0 | 30.2 | 5 | 5 | 4 | 5 | A | A | Accepted | Invention |
| 26 | 2 | 48.0 | 2.1 | 70.2 | 5 | 5 | 5 | 5 | A | A | Accepted | Invention |
| 27 | 2 | 45.6 | 2.0 | 104.8 | 5 | 5 | 5 | 5 | B | B | Rejected | Comparative Example |
| 28 | 2 | 44.8 | 2.0 | 144.6 | 5 | 5 | 4 | 5 | C | C | Rejected | Comparative Example |

TABLE 4

| No. | Steel No. in Table 1 | Paint film | | | Corrosion-resistance | | | | Paint film adhesion | | Overall Evaluation | Remarks |
|---|---|---|---|---|---|---|---|---|---|---|---|---|
| | | Zn content (% by volume) | Zn average particle diameter (μm) | Average dry film thickness (μm) | Erichsen | Cross-shaped cut | Gravel | Gap | Cross-shaped cut | Gravel | | |
| 29 | 3 | 7.9 | 2.0 | 24.8 | 2 | 2 | 1 | 1 | A | A | Rejected | Comparative Example |
| 30 | 3 | 22.1 | 2.1 | 24.5 | 5 | 4 | 4 | 4 | A | A | Accepted | Invention |
| 31 | 3 | 29.2 | 2.2 | 25.3 | 5 | 4 | 4 | 5 | A | A | Accepted | Invention |
| 32 | 3 | 45.0 | 1.7 | 25.0 | 5 | 5 | 4 | 5 | A | A | Accepted | Invention |
| 33 | 3 | 55.8 | 1.8 | 25.1 | 5 | 5 | 5 | 5 | A | A | Accepted | Invention |
| 34 | 3 | 69.9 | 2.1 | 25.2 | 5 | 5 | 4 | 5 | B | B | Rejected | Comparative Example |
| 35 | 3 | 88.2 | 2.1 | 24.6 | 4 | 5 | 5 | 4 | C | C | Rejected | Comparative Example |
| 36 | 4 | 30.1 | 2.0 | 24.8 | 3 | 3 | 2 | 2 | A | A | Rejected | Comparative Example |
| 37 | 4 | 44.6 | 5.9 | 24.9 | 3 | 3 | 2 | 2 | A | A | Rejected | Comparative Example |

TABLE 5

| No. | C (% by mass) | Si (% by mass) | Mn (% by mass) | P (% by mass) | S (% by mass) | Cr (% by mass) | Ni (% by mass) | Mo (% by mass) | Cu (% by mass) | Nb (% by mass) | Ti (% by mass) | N (% by mass) | Cr + 3.3Mo |
|---|---|---|---|---|---|---|---|---|---|---|---|---|---|
| 1 | 0.012 | 0.40 | 0.30 | 0.035 | 0.005 | 18.00 | 0.001 | 0.001 | 0.001 | 0.470 | 0.001 | 0.011 | 18.0 |
| 2 | 0.004 | 0.06 | 0.15 | 0.025 | 0.005 | 17.80 | 0.001 | 1.200 | 0.002 | 0.001 | 0.270 | 0.007 | 21.8 |
| 3 | 0.004 | 0.11 | 0.15 | 0.027 | 0.006 | 18.00 | 0.001 | 1.460 | 0.001 | — | 0.280 | 0.007 | 22.8 |
| 4 | 0.004 | 0.10 | 0.30 | 0.035 | 0.005 | 18.00 | 0.100 | 1.800 | 0.001 | 0.310 | 0.001 | 0.008 | 23.9 |
| 5 | 0.060 | 0.32 | 0.60 | 0.030 | 0.006 | 16.15 | 0.001 | 0.001 | 0.001 | 0.120 | 0.200 | 0.060 | 16.2 |
| 6 | 0.009 | 0.37 | 0.25 | 0.030 | 0.003 | 11.30 | 0.200 | 0.001 | 0.001 | 0.310 | 0.001 | 0.009 | 11.3 |
| 7 | 0.012 | 0.20 | 1.50 | 0.030 | 0.006 | 10.95 | 0.300 | 0.001 | 0.330 | 0.001 | 0.001 | 0.007 | 11.0 |
| 8 | 0.012 | 0.30 | 1.30 | 0.020 | 0.005 | 9.10 | 0.400 | 0.100 | 0.200 | 0.001 | 0.001 | 0.009 | 9.4 |
| 9 | 0.018 | 0.22 | 1.30 | 0.020 | 0.005 | 5.60 | 0.250 | 0.050 | 0.150 | 0.001 | 0.001 | 0.009 | 5.8 |

TABLE 6

| No. | No. in Table 5 | Cr + 3.3Mo | 70 − 2.7 × (Cr + 3.3Mo) | Paint film Zn Content (% by mass) | Zn average particle diameter (μm) | Average dry film thickness (μm) | Erichsen | Cross-shaped cut | Gravel | Gap (plastic) | Gap (back) | Overall Evaluation | Remarks |
|---|---|---|---|---|---|---|---|---|---|---|---|---|---|
| 1 | 1 | 18.0 | 21.4 | 5.1 | 1.9 | 19.6 | 3 | 2 | 1 | 1 | 1 | Rejected | Comparative Example |
| 2 | 1 | 18.0 | 21.4 | 14.7 | 1.9 | 19.9 | 3 | 3 | 1 | 1 | 1 | Rejected | Comparative Example |
| 3 | 1 | 18.0 | 21.4 | 20.4 | 2.2 | 20.3 | 4 | 5 | 2 | 2 | 2 | Rejected | Comparative Example |
| 4 | 1 | 18.0 | 21.4 | 24.9 | 2.2 | 20.0 | 5 | 5 | 3 | 3 | 3 | Accepted | Invention |
| 5 | 1 | 18.0 | 21.4 | 30.1 | 2.0 | 20.3 | 5 | 5 | 3 | 3 | 3 | Accepted | Invention |
| 6 | 2 | 21.8 | 11.14 | 5.0 | 2.0 | 25.4 | 3 | 2 | 2 | 2 | 2 | Rejected | Comparative Example |
| 7 | 2 | 21.8 | 11.14 | 10.3 | 1.8 | 25.1 | 4 | 5 | 2 | 3 | 2 | Rejected | Comparative Example |
| 8 | 2 | 21.8 | 11.14 | 14.8 | 1.8 | 25.1 | 5 | 5 | 3 | 3 | 3 | Accepted | Invention |
| 9 | 2 | 21.8 | 11.14 | 20.0 | 2.2 | 24.6 | 5 | 5 | 4 | 4 | 4 | Accepted | Invention |
| 10 | 2 | 21.8 | 11.14 | 25.4 | 2.3 | 25.0 | 5 | 5 | 5 | 5 | 5 | Accepted | Invention |
| 11 | 2 | 21.8 | 11.14 | 50.3 | 2.2 | 25.2 | 5 | 5 | 5 | 5 | 5 | Accepted | Invention |
| 12 | 2 | 21.8 | 11.14 | 59.8 | 2.2 | 25.4 | 5 | 5 | 5 | 5 | 5 | Accepted | Invention |
| 13 | 2 | 21.8 | 11.14 | 69.8 | 2.3 | 24.9 | 5 | 5 | 5 | 5 | 5 | Accepted | Invention |
| 14 | 2 | 21.8 | 11.14 | 79.5 | 1.9 | 24.8 | 4 | 3 | 2 | 3 | 4 | Rejected | Comparative Example |
| 15 | 3 | 22.8 | 8.44 | 0 | — | 19.9 | 4 | 4 | 2 | 2 | 2 | Rejected | Comparative Example |
| 16 | 3 | 22.8 | 8.44 | 5.0 | 2.3 | 20.3 | 5 | 4 | 2 | 2 | 2 | Rejected | Comparative Example |
| 17 | 3 | 22.8 | 8.44 | 9.9 | 2.0 | 20.4 | 5 | 5 | 4 | 4 | 4 | Accepted | Invention |

TABLE 7

| No. | No. in Table 5 | Cr + 3.3Mo | 70 − 2.7 × (Cr + 3.3Mo) | Paint film Zn Content (% by mass) | Zn average particle diameter (μm) | Average dry film thickness (μm) | Erichsen | Cross-shaped cut | Gravel | Gap (plastic) | Gap (back) | Overall Evaluation | Remarks |
|---|---|---|---|---|---|---|---|---|---|---|---|---|---|
| 18 | 4 | 23.9 | 5.47 | 0 | — | 20.3 | 4 | 5 | 2 | 2 | 2 | Rejected | Comparative Example |
| 19 | 4 | 23.9 | 5.47 | 4.8 | 2.1 | 20.2 | 5 | 5 | 3 | 2 | 2 | Rejected | Comparative Example |
| 20 | 4 | 23.9 | 5.47 | 10.3 | 2.1 | 19.8 | 5 | 5 | 4 | 4 | 5 | Accepted | Invention |
| 21 | 5 | 16.2 | 26.26 | 0 | — | 19.7 | 3 | 2 | 1 | 1 | 1 | Rejected | Comparative Example |
| 22 | 5 | 16.2 | 26.26 | 9.5 | 2.1 | 19.6 | 4 | 2 | 2 | 2 | 1 | Rejected | Comparative Example |
| 23 | 5 | 16.2 | 26.26 | 20.1 | 2.0 | 19.6 | 5 | 3 | 2 | 2 | 2 | Rejected | Comparative Example |
| 24 | 5 | 16.2 | 26.26 | 29.8 | 2.0 | 19.8 | 5 | 5 | 3 | 3 | 4 | Accepted | Invention |
| 25 | 6 | 11.3 | 39.49 | 0 | — | 20.4 | 2 | 1 | 1 | 1 | 1 | Rejected | Comparative Example |
| 26 | 6 | 11.3 | 39.49 | 20.0 | 2.1 | 20.1 | 2 | 2 | 2 | 1 | 1 | Rejected | Comparative Example |
| 27 | 6 | 11.3 | 39.49 | 40.1 | 1.9 | 20.0 | 4 | 4 | 3 | 3 | 3 | Accepted | Invention |
| 28 | 6 | 11.3 | 39.49 | 59.6 | 2.1 | 20.4 | 5 | 5 | 5 | 5 | 5 | Accepted | Invention |
| 29 | 6 | 11.3 | 39.49 | 79.8 | 1.9 | 20.3 | 3 | 4 | 2 | 5 | 5 | Rejected | Comparative Example |
| 30 | 8 | 9.4 | 44.62 | 0 | — | 20.3 | 1 | 1 | 1 | 1 | 1 | Rejected | Comparative Example |
| 31 | 8 | 9.4 | 44.62 | 20.0 | 1.9 | 20.4 | 2 | 1 | 1 | 1 | 1 | Rejected | Comparative Example |
| 32 | 8 | 9.4 | 44.62 | 39.5 | 2.0 | 20.4 | 4 | 3 | 2 | 2 | 2 | Rejected | Comparative Example |
| 33 | 8 | 9.4 | 44.62 | 59.8 | 2.2 | 19.6 | 5 | 4 | 3 | 3 | 4 | Accepted | Invention |

TABLE 8

| No. | No. in Table 5 | Cr + 3.3Mo | 70 − 2.7 × (Cr + 3.3Mo) | Paint film Zn Content (% by mass) | Zn average particle diameter (μm) | Average dry film thickness (μm) | Corrosion test results Erichsen | Cross-shaped cut | Gravel | Gap (plastic) | Gap (back) | Overall Evaluation | Remarks |
|---|---|---|---|---|---|---|---|---|---|---|---|---|---|
| 34 | 9 | 5.8 | 54.34 | 0 | — | 19.5 | 1 | 1 | 1 | 1 | 1 | Rejected | Comparative Example |
| 35 | 9 | 5.8 | 54.34 | 19.8 | 2.5 | 20.0 | 1 | 1 | 1 | 1 | 1 | Rejected | Comparative Example |
| 36 | 9 | 5.8 | 54.34 | 39.8 | 2.5 | 20.1 | 4 | 4 | 1 | 2 | 2 | Rejected | Comparative Example |
| 37 | 9 | 5.8 | 54.34 | 60.3 | 2.5 | 20.2 | 5 | 5 | 2 | 4 | 4 | Rejected | Comparative Example |
| 38 | 9 | 5.8 | 54.34 | 79.9 | 2.5 | 20.3 | 3 | 2 | 1 | 4 | 4 | Rejected | Comparative Example |
| 39 | 7 | 11.0 | 40.3 | 50.0 | 0.8 | 19.6 | 5 | 5 | 5 | 5 | 5 | Accepted | Invention |
| 40 | 7 | 11.0 | 40.3 | 50.0 | 1.2 | 20.3 | 5 | 5 | 5 | 5 | 5 | Accepted | Invention |
| 41 | 7 | 11.0 | 40.3 | 49.9 | 2.0 | 20.0 | 5 | 5 | 5 | 5 | 5 | Accepted | Invention |
| 42 | 7 | 11.0 | 40.3 | 49.6 | 2.7 | 20.4 | 3 | 5 | 4 | 5 | 5 | Accepted | Invention |
| 43 | 7 | 11.0 | 40.3 | 49.5 | 3.2 | 19.6 | 3 | 5 | 4 | 5 | 5 | Accepted | Invention |
| 44 | 7 | 11.0 | 40.3 | 49.6 | 4.9 | 19.8 | 3 | 5 | 3 | 5 | 5 | Accepted | Invention |
| 45 | 6 | 11.3 | 39.49 | 50.0 | 5.0 | 2.2 | 3 | 3 | 3 | 4 | 3 | Accepted | Invention |
| 46 | 6 | 11.3 | 39.49 | 50.3 | 5.0 | 3.6 | 4 | 4 | 3 | 4 | 5 | Accepted | Invention |
| 47 | 6 | 11.3 | 39.49 | 50.2 | 5.0 | 5.9 | 4 | 5 | 4 | 5 | 5 | Accepted | Invention |
| 48 | 6 | 11.3 | 39.49 | 49.8 | 5.0 | 10.0 | 5 | 5 | 4 | 5 | 5 | Accepted | Invention |
| 49 | 6 | 11.3 | 39.49 | 49.8 | 5.0 | 39.5 | 5 | 5 | 5 | 5 | 5 | Accepted | Invention |
| 50 | 6 | 11.3 | 39.49 | 50.1 | 5.0 | 54.7 | 3 | 5 | 4 | 5 | 5 | Accepted | Invention |
| 51 | 6 | 11.3 | 39.49 | 50.0 | 5.1 | 100.4 | 3 | 5 | 2 | 5 | 5 | Accepted | Invention |

TABLE 9

| No | C (% by mass) | Si (% by mass) | Mn (% by mass) | P (% by mass) | S (% by mass) | Cr (% by mass) | Ni (% by mass) | Mo (% by mass) | Cu (% by mass) | Al (% by mass) | N (% by mass) | B (% by mass) | Pitting index (Cr + 3.3Mo) | TS (MPa) | Remarks |
|---|---|---|---|---|---|---|---|---|---|---|---|---|---|---|---|
| 1 | 0.009 | 0.37 | 0.600 | 0.030 | 0.003 | 12.50 | 5.300 | 0.300 | 0.001 | 0.010 | 0.011 | — | 11.3 | 530 | Present Invention Steel |
| 2 | 0.012 | 0.20 | 1.500 | 0.030 | 0.006 | 10.95 | 0.300 | 0.001 | 0.330 | 0.020 | 0.007 | — | 11.0 | 552 | Present Invention Steel |
| 3 | 0.012 | 0.20 | 1.500 | 0.030 | 0.006 | 10.95 | 0.300 | 0.001 | 0.330 | 0.020 | 0.007 | 0.001 | 11.0 | 545 | Present Invention Steel |
| 4 | 0.012 | 0.30 | 1.300 | 0.020 | 0.005 | 9.10 | 0.400 | 0.100 | 0.200 | 0.013 | 0.009 | — | 9.4 | 570 | Present Invention Steel |
| 5 | 0.018 | 0.22 | 1.300 | 0.020 | 0.005 | 5.60 | 0.250 | 0.050 | 0.150 | 0.011 | 0.009 | — | 5.8 | 543 | Comparative Example Steel |

TABLE 10

| No. | Steel No. in Table 9 | Pitting index (Cr + 3.3Mo) | Paint film Left side in Expression 1 {70 − 2.7 × (Cr + 3.3Mo)} | Zn Content (% by mass) | Zn average particle diameter (μm) | Average dry film thickness (μm) | Evaluation results of corrosion-resistance, etc. Gravel | Gap (plastic) | Through hole | Edge (shearing face) | TIG welding | Overall evaluation | Overall evaluation | Remarks |
|---|---|---|---|---|---|---|---|---|---|---|---|---|---|---|
| 1 | 1 | 13.5 | 33.55 | 0 | — | 19.6 | 1 | 1 | 1 | 1 | 1 | 5 | Rejected | Comparative Example |

TABLE 10-continued

| No. | Steel No. in Table 9 | Pitting index (Cr + 3.3Mo) | Paint film Left side in Expression 1 {70 − 2.7 × (Cr + 3.3Mo)} | Zn Content (% by mass) | Zn average particle diameter (μm) | Average dry film thickness (μm) | Gravel | Gap (plastic) | Through hole | Edge (shearing face) | TIG welding | Overall evaluation | Overall evaluation | Remarks |
|---|---|---|---|---|---|---|---|---|---|---|---|---|---|---|
| 2 | 1 | 13.5 | 33.55 | 9.8 | 4.7 | 19.6 | 2 | 3 | 3 | 3 | 2 | 12 | Accepted | Invention |
| 3 | 1 | 13.5 | 33.55 | 29.7 | 4.9 | 19.8 | 2 | 5 | 4 | 5 | 3 | 19 | Accepted | Invention |
| 4 | 1 | 13.5 | 33.55 | 50.0 | 4.9 | 19.5 | 5 | 5 | 5 | 5 | 5 | 25 | Accepted | Invention |
| 5 | 1 | 13.5 | 33.55 | 70.4 | 4.9 | 19.6 | 5 | 5 | 5 | 5 | 5 | 25 | Accepted | Invention |
| 6 | 1 | 13.5 | 33.55 | 90.2 | 4.7 | 19.8 | 1 | 5 | 5 | 4 | 3 | 18 | Rejected | Comparative Example |
| 7 | 2 | 11.0 | 40.3 | 0 | — | 19.9 | 1 | 1 | 1 | 1 | 1 | 5 | Rejected | Comparative Example |
| 8 | 2 | 11.0 | 40.3 | 30.2 | 3.0 | 19.5 | 2 | 4 | 5 | 5 | 4 | 20 | Accepted | Invention |
| 9 | 2 | 11.0 | 40.3 | 40.4 | 3.0 | 19.8 | 2 | 4 | 5 | 5 | 4 | 20 | Accepted | Invention |
| 10 | 2 | 11.0 | 40.3 | 50.3 | 3.0 | 19.8 | 5 | 5 | 3 | 5 | 5 | 23 | Accepted | Invention |
| 11 | 2 | 11.0 | 40.3 | 69.7 | 2.7 | 20.3 | 5 | 5 | 4 | 5 | 5 | 24 | Accepted | Invention |
| 12 | 2 | 11.0 | 40.3 | 90.2 | 2.7 | 19.8 | 2 | 4 | 2 | 4 | 5 | 17 | Rejected | Comparative Example |
| 13 | 2 | 11.0 | 40.3 | 0 | — | 19.8 | 1 | 1 | 1 | 1 | 1 | 5 | Rejected | Comparative Example |
| 14 | 2 | 11.0 | 40.3 | 29.8 | 5.0 | 19.6 | 2 | 5 | 4 | 5 | 3 | 19 | Accepted | Invention |
| 15 | 2 | 11.0 | 40.3 | 50.1 | 5.0 | 19.8 | 5 | 5 | 5 | 5 | 5 | 25 | Accepted | Invention |
| 16 | 2 | 11.0 | 40.3 | 69.7 | 5.1 | 19.6 | 5 | 5 | 5 | 5 | 5 | 25 | Accepted | Invention |
| 17 | 2 | 11.0 | 40.3 | 90.3 | 5.2 | 19.8 | 2 | 4 | 2 | 5 | 3 | 16 | Rejected | Comparative Example |

TABLE 11

| No. | Steel No. in Table 9 | Pitting index (Cr + 3.3Mo) | Paint film Left side in Expression 1 {70 − 2.7 × (Cr + 3.3Mo)} | Zn Content (% by mass) | Zn average particle diameter (μm) | Average dry film thickness (μm) | Gravel | Gap (plastic) | Through hole | Edge (shearing face) | TIG welding | Overall evaluation | Overall evaluation | Remarks |
|---|---|---|---|---|---|---|---|---|---|---|---|---|---|---|
| 18 | 3 | 11.0 | 40.3 | 29.5 | 4.8 | 19.9 | 2 | 5 | 4 | 5 | 3 | 19 | Accepted | Invention |
| 19 | 3 | 11.0 | 40.3 | 49.6 | 4.7 | 20.1 | 5 | 5 | 5 | 5 | 5 | 25 | Accepted | Invention |
| 20 | 4 | 9.4 | 44.62 | 0 | — | 15.1 | 1 | 1 | 1 | 1 | 1 | 5 | Rejected | Comparative Example |
| 21 | 4 | 9.4 | 44.62 | 10.0 | 5.0 | 14.8 | 1 | 2 | 2 | 2 | 2 | 9 | Rejected | Comparative Example |
| 22 | 4 | 9.4 | 44.62 | 20.1 | 4.9 | 14.8 | 2 | 4 | 5 | 5 | 4 | 20 | Accepted | Invention |
| 23 | 4 | 9.4 | 44.62 | 40.4 | 5.2 | 14.8 | 2 | 5 | 5 | 5 | 5 | 22 | Accepted | Invention |
| 24 | 4 | 9.4 | 44.62 | 60.0 | 5.2 | 14.6 | 5 | 5 | 5 | 5 | 5 | 25 | Accepted | Invention |
| 25 | 5 | 5.8 | 54.34 | 0 | — | 8.0 | 1 | 1 | 1 | 1 | 1 | 5 | Rejected | Comparative Example |
| 26 | 5 | 5.8 | 54.34 | 19.6 | 5.1 | 8.2 | 1 | 2 | 2 | 1 | 1 | 7 | Rejected | Comparative Example |
| 27 | 5 | 5.8 | 54.34 | 40.3 | 5.2 | 8.3 | 1 | 3 | 3 | 2 | 2 | 11 | Rejected | Comparative Example |
| 28 | 5 | 5.8 | 54.34 | 60.3 | 5.3 | 8.2 | 2 | 3 | 3 | 2 | 3 | 13 | Rejected | Comparative Example |
| 29 | 5 | 5.8 | 54.34 | 80.2 | 5.0 | 8.2 | 2 | 2 | 2 | 2 | 2 | 10 | Rejected | Comparative Example |

TABLE 12

| | Steel | | Paint film Left side in Expression 1 | | | | Evaluation results of corrosion-resistance, etc. | | | | | | | |
|---|---|---|---|---|---|---|---|---|---|---|---|---|---|---|
| No. | No. in Table 9 | Pitting index (Cr + 3.3Mo) | {70 − 2.7 × (Cr + 3.3Mo)} | Zn Content (% by mass) | Zn average particle diameter (μm) | Average dry film thickness (μm) | Gravel | Gap (plastic) | Through hole | Edge (shearing face) | TIG welding | Overall evaluation | Overall evaluation | Remarks |
| 30 | 2 | 11.0 | 40.3 | 49.8 | 1.7 | 3.0 | 1 | 2 | 1 | 2 | 1 | 7 | Rejected | Comparative Example |
| 31 | 2 | 11.0 | 40.3 | 49.8 | 2.0 | 4.9 | 5 | 5 | 5 | 5 | 5 | 25 | Accepted | Invention |
| 32 | 2 | 11.0 | 40.3 | 49.8 | 2.2 | 25.1 | 5 | 5 | 5 | 5 | 5 | 25 | Accepted | Invention |
| 33 | 2 | 11.0 | 40.3 | 50.1 | 2.0 | 50.4 | 5 | 5 | 5 | 5 | 5 | 25 | Accepted | Invention |
| 34 | 2 | 11.0 | 40.3 | 50.3 | 2.1 | 60.3 | 5 | 5 | 5 | 5 | 5 | 25 | Rejected | Comparative Example |
| 35 | 2 | 11.0 | 40.3 | 50.0 | 2.2 | 19.6 | 5 | 5 | 5 | 5 | 5 | 25 | Accepted | Invention |
| 36 | 2 | 11.0 | 40.3 | 50.3 | 4.2 | 19.6 | 3 | 5 | 5 | 3 | 5 | 21 | Accepted | Invention |
| 37 | 2 | 11.0 | 40.3 | 50.2 | 10.3 | 19.9 | 3 | 5 | 3 | 3 | 3 | 17 | Accepted | Invention |

\* No. 34: Though corrosion resistance was sufficient, the drying time for the film is long, and work efficiency is poor, so this is listed as an Rejected comparative example.

TABLE 13

| No. | C (% by mass) | Si (% by mass) | Mn (% by mass) | P (% by mass) | S (% by mass) | Al (% by mass) | Cr (% by mass) | Ni (% by mass) | Mo (% by mass) | Cu (% by mass) | Nb (% by mass) | Ti (% by mass) | N (% by mass) | B (% by mass) | Pitting index (Cr + 3.3Mo) | Remarks |
|---|---|---|---|---|---|---|---|---|---|---|---|---|---|---|---|---|
| 1 | 0.012 | 0.40 | 0.30 | 0.035 | 0.005 | 0.012 | 18.00 | 0.001 | 0.001 | 0.001 | 0.470 | 0.001 | 0.011 | — | 18.0 | Present Invention Steel |
| 2 | 0.004 | 0.06 | 0.15 | 0.025 | 0.005 | 0.025 | 17.80 | 0.001 | 1.200 | 0.002 | 0.001 | 0.270 | 0.007 | 0.0007 | 21.8 | Present Invention Steel |
| 3 | 0.004 | 0.11 | 0.15 | 0.027 | 0.006 | 0.025 | 18.00 | 0.001 | 1.460 | 0.001 | — | 0.280 | 0.007 | 0.0005 | 22.8 | Present Invention Steel |
| 4 | 0.004 | 0.10 | 0.30 | 0.035 | 0.005 | 0.010 | 18.00 | 0.100 | 1.800 | 0.001 | 0.310 | 0.001 | 0.008 | — | 23.9 | Present Invention Steel |
| 5 | 0.060 | 0.32 | 0.60 | 0.030 | 0.006 | 0.020 | 16.15 | 0.001 | 0.001 | 0.001 | 0.120 | 0.200 | 0.060 | — | 16.2 | Present Invention Steel |
| 6 | 0.009 | 0.37 | 0.25 | 0.030 | 0.003 | 0.010 | 11.30 | 0.200 | 0.001 | 0.001 | 0.001 | 0.310 | 0.009 | — | 11.3 | Present Invention Steel |
| 7 | 0.012 | 0.20 | 1.50 | 0.030 | 0.006 | 0.011 | 10.95 | 0.300 | 0.001 | 0.330 | 0.001 | 0.001 | 0.007 | — | 11.0 | Comparative Example Steel |
| 8 | 0.012 | 0.30 | 1.30 | 0.020 | 0.005 | 0.021 | 9.10 | 0.400 | 0.100 | 0.200 | 0.001 | 0.001 | 0.009 | — | 9.4 | Comparative Example Steel |
| 9 | 0.018 | 0.22 | 1.30 | 0.020 | 0.005 | 0.012 | 5.60 | 0.250 | 0.050 | 0.150 | 0.001 | 0.001 | 0.009 | 0.0005 | 5.8 | Comparative Example Steel |

TABLE 14

| No. | Steel No. in Table 13 | Pitting index (Cr + 3.3Mo) | Paint film Left side in Expression 1 {70 − 2.7 × (Cr + 3.3 3.3Mo)} | Zn Content (% by mass) | Zn average particle diameter (μm) | Average dry film thickness (μm) | Evaluation results of corrosion-resistance, etc. | | | | | | | |
|---|---|---|---|---|---|---|---|---|---|---|---|---|---|---|
| | | | | | | | Erichsen | Cross-shaped cut | Gravel | Gap (plastic) | EI (%) | r value | Gasoline corrosion test | Overall evaluation | Remarks |
| 1 | 1 | 18.0 | 21.40 | 5.1 | 1.9 | 19.6 | 3 | 2 | 1 | 1 | 35.1 | 2.15 | OK | Rejected | Comparative Example |
| 2 | 1 | 18.0 | 21.40 | 14.7 | 1.9 | 19.9 | 3 | 3 | 1 | 1 | 35.1 | 2.15 | OK | Rejected | Comparative Example |
| 3 | 1 | 18.0 | 21.40 | 20.4 | 2.2 | 20.3 | 4 | 5 | 2 | 2 | 35.1 | 2.15 | OK | Rejected | Comparative Example |
| 4 | 1 | 18.0 | 21.40 | 24.9 | 2.2 | 20.0 | 5 | 5 | 3 | 3 | 35.1 | 2.15 | OK | Accepted | Invention |
| 5 | 1 | 18.0 | 21.40 | 30.1 | 2.0 | 20.3 | 5 | 5 | 3 | 3 | 35.1 | 2.15 | OK | Accepted | Invention |
| 6 | 2 | 21.8 | 11.14 | 5.0 | 2.0 | 25.4 | 3 | 2 | 2 | 2 | 34.5 | 2.33 | OK | Rejected | Comparative Example |
| 7 | 2 | 21.8 | 11.14 | 10.3 | 1.8 | 25.1 | 4 | 5 | 2 | 3 | 34.5 | 2.33 | OK | Rejected | Comparative Example |
| 8 | 2 | 21.8 | 11.14 | 14.8 | 1.8 | 25.1 | 5 | 5 | 3 | 3 | 34.5 | 2.33 | OK | Accepted | Invention |
| 9 | 2 | 21.8 | 11.14 | 20.0 | 2.2 | 24.6 | 5 | 5 | 4 | 4 | 34.5 | 2.33 | OK | Accepted | Invention |
| 10 | 2 | 21.8 | 11.14 | 25.4 | 2.3 | 25.0 | 5 | 5 | 5 | 5 | 34.5 | 2.33 | OK | Accepted | Invention |
| 11 | 2 | 21.8 | 11.14 | 50.3 | 2.2 | 25.2 | 5 | 5 | 5 | 5 | 34.5 | 2.33 | OK | Accepted | Invention |
| 12 | 2 | 21.8 | 11.14 | 59.8 | 2.2 | 25.4 | 5 | 5 | 5 | 5 | 34.5 | 2.33 | OK | Accepted | Invention |
| 13 | 2 | 21.8 | 11.14 | 69.8 | 2.3 | 24.9 | 5 | 5 | 5 | 5 | 34.5 | 2.33 | OK | Accepted | Invention |
| 14 | 2 | 21.8 | 11.14 | 79.5 | 1.9 | 24.8 | 4 | 3 | 2 | 3 | 34.5 | 2.33 | OK | Rejected | Comparative Example |
| 15 | 3 | 22.8 | 8.44 | 0 | — | 19.9 | 4 | 4 | 2 | 2 | 34.0 | 2.25 | OK | Rejected | Comparative Example |
| 16 | 3 | 22.8 | 8.44 | 5.0 | 2.3 | 20.3 | 5 | 4 | 2 | 2 | 34.0 | 2.25 | OK | Rejected | Comparative Example |
| 17 | 3 | 22.8 | 8.44 | 9.9 | 2.0 | 20.4 | 5 | 5 | 4 | 4 | 34.0 | 2.25 | OK | Accepted | Invention |

TABLE 15

| No. | Steel No. in Table 13 | Pitting index (Cr + 3.3Mo) | Paint film Left side in Expression 1 {70 − 2.7 × (Cr + 3.3 3.3Mo)} | Zn Content (% by mass) | Zn average particle diameter (μm) | Average dry film thickness (μm) | Evaluation results of corrosion-resistance, etc. | | | | | | | |
|---|---|---|---|---|---|---|---|---|---|---|---|---|---|---|
| | | | | | | | Erichsen | Cross-shaped cut | Gravel | Gap (plastic) | EI (%) | r value | Gasoline corrosion test | Overall evaluation | Remarks |
| 18 | 4 | 23.9 | 5.47 | 0 | — | 20.3 | 4 | 5 | 2 | 2 | 32.1 | 1.86 | OK | Rejected | Comparative Example |
| 19 | 4 | 23.9 | 5.47 | 4.8 | 2.1 | 20.2 | 5 | 5 | 3 | 2 | 32.1 | 1.86 | OK | Rejected | Comparative Example |
| 20 | 4 | 23.9 | 5.47 | 10.3 | 2.1 | 19.8 | 5 | 5 | 4 | 4 | 32.1 | 1.86 | OK | Accepted | Invention |
| 21 | 5 | 16.2 | 26.26 | 0 | — | 19.7 | 3 | 2 | 1 | 1 | 30.3 | 1.29 | OK | Rejected | Comparative Example |
| 22 | 5 | 16.2 | 26.26 | 9.5 | 2.1 | 19.6 | 4 | 2 | 2 | 2 | 30.3 | 1.29 | OK | Rejected | Comparative Example |
| 23 | 5 | 16.2 | 26.26 | 20.1 | 2.0 | 19.6 | 5 | 3 | 2 | 2 | 30.3 | 1.29 | OK | Rejected | Comparative Example |
| 24 | 5 | 16.2 | 26.26 | 29.8 | 2.0 | 19.8 | 5 | 5 | 3 | 3 | 30.3 | 1.29 | OK | Accepted | Invention |
| 25 | 6 | 11.3 | 39.49 | 0 | — | 20.4 | 2 | 1 | 1 | 1 | 35.7 | 1.83 | OK | Rejected | Comparative Example |
| 26 | 6 | 11.3 | 39.49 | 20.0 | 2.1 | 20.1 | 2 | 2 | 2 | 1 | 35.7 | 1.83 | OK | Rejected | Comparative Example |
| 27 | 6 | 11.3 | 39.49 | 40.1 | 1.9 | 20.0 | 4 | 4 | 3 | 3 | 35.7 | 1.83 | OK | Accepted | Invention |
| 28 | 6 | 11.3 | 39.49 | 59.6 | 2.1 | 20.4 | 5 | 5 | 5 | 5 | 35.7 | 1.83 | OK | Accepted | Invention |
| 29 | 6 | 11.3 | 39.49 | 79.8 | 1.9 | 20.3 | 3 | 4 | 2 | 5 | 35.7 | 1.83 | OK | Rejected | Comparative Example |

TABLE 15-continued

| | Steel | | Paint film | | | Evaluation results of corrosion-resistance, etc. | | | | | | | | |
|---|---|---|---|---|---|---|---|---|---|---|---|---|---|---|
| | | | Left side in Expression 1 | Zn | Average | | | | | | | Gasoline | | |
| No. | No. in Table 13 | Pitting index (Cr + 3.3Mo) | {70 − 2.7 × (Cr + 3.3Mo)} | Zn Content (% by mass) | Zn average particle diameter (μm) | Average dry film thickness (μm) | Erichsen | Cross-shaped cut | Gravel | Gap (plastic) | EI (%) | r value | corrosion test | Overall evaluation | Remarks |
| 30 | 8 | 9.4 | 44.62 | 0 | — | 20.3 | 1 | 1 | 1 | 1 | 36.1 | 1.50 | Poor | Rejected | Comparative Example |
| 31 | 8 | 9.4 | 44.62 | 20.0 | 1.9 | 20.4 | 2 | 1 | 1 | 1 | 36.1 | 1.50 | Poor | Rejected | Comparative Example |
| 32 | 8 | 9.4 | 44.62 | 39.5 | 2.0 | 20.4 | 4 | 3 | 2 | 2 | 36.1 | 1.50 | Poor | Rejected | Comparative Example |
| 33 | 8 | 9.4 | 44.62 | 59.8 | 2.2 | 19.6 | 5 | 4 | 3 | 3 | 36.1 | 1.50 | Poor | Rejected | Comparative Example |

TABLE 16

| | Steel | | Paint film | | | Evaluation results of corrosion-resistance, etc. | | | | | | | | |
|---|---|---|---|---|---|---|---|---|---|---|---|---|---|---|
| | | | Left side in Expression 1 | Zn | Average | | | | | | | Gasoline | | |
| No. | No. in Table 13 | Pitting index (Cr + 3.3Mo) | {70 − 2.7 × (Cr + 3.3Mo)} | Zn Content (% by mass) | Zn average particle diameter (μm) | Average dry film thickness (μm) | Erichsen | Cross-shaped cut | Gravel | Gap (plastic) | EI (%) | r value | corrosion test | Overall evaluation | Remarks |
| 34 | 9 | 5.8 | 54.34 | 0 | — | 19.5 | 1 | 1 | 1 | 1 | 38.5 | 1.61 | Poor | Rejected | Comparative Example |
| 35 | 9 | 5.8 | 54.34 | 19.8 | 2.5 | 20.0 | 1 | 1 | 1 | 1 | 38.5 | 1.61 | Poor | Rejected | Comparative Example |
| 36 | 9 | 5.8 | 54.34 | 39.8 | 2.5 | 20.1 | 4 | 4 | 1 | 2 | 38.5 | 1.61 | Poor | Rejected | Comparative Example |
| 37 | 9 | 5.8 | 54.34 | 60.3 | 2.5 | 20.2 | 5 | 5 | 2 | 4 | 38.5 | 1.61 | Poor | Rejected | Comparative Example |
| 38 | 9 | 5.8 | 54.34 | 79.9 | 2.5 | 20.3 | 3 | 2 | 1 | 4 | 38.5 | 1.61 | Poor | Rejected | Comparative Example |
| 39 | 7 | 11.0 | 40.30 | 50.0 | 0.8 | 19.6 | 3 | 2 | 2 | 4 | 31.3 | 1.55 | Poor | Rejected | Comparative Example |
| 40 | 7 | 11.0 | 40.30 | 50.0 | 1.2 | 20.3 | 3 | 2 | 2 | 4 | 31.3 | 1.55 | Poor | Rejected | Comparative Example |
| 41 | 7 | 11.0 | 40.30 | 49.9 | 2.0 | 20.0 | 3 | 2 | 2 | 4 | 31.3 | 1.55 | Poor | Rejected | Comparative Example |
| 42 | 7 | 11.0 | 40.30 | 49.6 | 2.7 | 20.4 | 3 | 2 | 2 | 4 | 31.3 | 1.55 | Poor | Rejected | Comparative Example |
| 43 | 7 | 11.0 | 40.30 | 49.5 | 3.2 | 19.6 | 3 | 2 | 2 | 4 | 31.3 | 1.55 | Poor | Rejected | Comparative Example |
| 44 | 7 | 11.0 | 40.30 | 49.6 | 4.9 | 19.8 | 3 | 2 | 1 | 4 | 31.3 | 1.55 | Poor | Rejected | Comparative Example |
| 45 | 6 | 11.3 | 39.49 | 50.0 | 5.0 | 2.2 | 3 | 3 | 3 | 4 | 35.7 | 1.83 | OK | Accepted | Invention |
| 46 | 6 | 11.3 | 39.49 | 50.3 | 5.0 | 3.6 | 4 | 4 | 3 | 4 | 35.7 | 1.83 | OK | Accepted | Invention |
| 47 | 6 | 11.3 | 39.49 | 50.2 | 5.0 | 5.9 | 4 | 5 | 4 | 5 | 35.7 | 1.83 | OK | Accepted | Invention |
| 48 | 6 | 11.3 | 39.49 | 49.8 | 5.0 | 10.0 | 5 | 5 | 4 | 5 | 35.7 | 1.83 | OK | Accepted | Invention |
| 49 | 6 | 11.3 | 39.49 | 49.8 | 5.0 | 39.5 | 5 | 5 | 5 | 5 | 35.7 | 1.83 | OK | Accepted | Invention |
| 50 | 6 | 11.3 | 39.49 | 50.1 | 5.0 | 54.7 | 3 | 5 | 4 | 5 | 35.7 | 1.83 | OK | Accepted | Invention |
| 51 | 6 | 11.3 | 39.49 | 50.0 | 5.1 | 100.4 | 3 | 5 | 2 | 5 | 35.7 | 1.83 | OK | Accepted | Invention |

What is claimed is:

1. A Fe—Cr alloy structure containing about 6% to about 25% by mass of Cr having a surface with at least one gap portion and having a corrosion-resistant film containing metal powder having ionization tendencies greater than iron on the surface, to a dry film thickness of about 5 μm to about 100 μm, so that the content of said metal powder in the dry paint film is about 20% to about 60% by volume, wherein the metal powder is zinc in an amount, based on the weight of the paint film, which satisfies Expression (1):

$$70-\{2.7\times(Cr+3.3Mo)\}\leq X\leq 70 \qquad (1)$$

wherein X is the metal zinc powder content (% by mass) in the paint film,
Cr is the Cr content (% by mass) in the Fe—Cr alloy, and Mo is the Mo content (% by mass) in the Fe—Cr alloy, wherein the composition of said Fe—Cr alloy structure is, in terms of % by mass, about 0.020% or less of C, about 1.0% or less of Si, about 0.5% to about 5.0% or less of Mn, about 0.05% or less of P, about 0.02% or less of S, about 6% to about 20% of Cr, about 1.0% or less of Al, and about 0.03% or less of N, with the remainder being essentially Fe and unavoidable impurities, which forms an alloy steel with a tensile strength (TS) of about 450 to abut 650 MPa.

2. The Fe—Cr alloy structure according to claim 1, wherein said Fe—Cr alloy structure further comprises, in terms of % by mass, about 3% or less of Mo, about 2% or less of Cu, and about 9% or less of Ni.

3. The Fe—Cr alloy structure according to claim 1, wherein said Fe—Cr alloy structure further comprises, in terms of % by mass, about 0.0003% to about 0.005% of B.

4. An underside member of an automobile formed from the Fe—Cr alloy structure according to claim 1.

5. The Fe—Cr alloy structure according to claim 1, wherein the average particle diameter of Zn in said Zn-containing dry paint film is about 3 μm or smaller.

6. A Fe—Cr alloy structure containing about 6% to about 25% by mass of Cr, having a surface with at least one gap portion and having a corrosion-resistant film containing metal powder having ionization tendencies greater than iron on the surface, wherein said metal powder is zinc in an amount, based on the weight of the paint film, which satisfies Expression (1):

$$70-\{2.7\times(Cr+3.3Mo)\}\leq X\leq 70 \qquad (1)$$

wherein X is the metal zinc powder content (% by mass) in the paint film,
Cr is the Cr content (% by mass) in the Fe—Cr alloy, and Mo is the Mo content (% by mass) in the Fe—Cr alloy, said metal powder content in a dry paint film is about 20% to about 60% by volume, and the dry paint film has a thickness of about 5 μm to about 100 μm, wherein said Fe—Cr alloy structure is a ferritic stainless steel, with a composition of, in terms of % by mass, about 0.1% or less of C, about 1.0% or less of Si, about 1.5% or less of Mn, about 0.06% or less of P, about 0.03% or less of S, about 1.0% or less of Al, about 11% to about 20% of Cr, and about 0.04% or less of N, about 0.01% to about 0.8% of Nb and/or about 0.01% to about 1.0% of Ti, with the remainder being essentially Fe and unavoidable impurities.

7. The Fe—Cr alloy structure according to claim 6, wherein said Fe—Cr alloy structure further comprises, in terms of % by mass, about 3.0% or less of Mo, about 2.0% or less of Cu, and about 2.0% or less of Ni.

8. The Fe—Cr alloy structure according to claim 6, wherein said Fe—Cr alloy structure further comprises, in terms of % by mass, about 0.0003% to about 0.005% of B.

9. The Fe—Cr alloy structure according to claim 6, wherein the average particle diameter of Zn in said Zn-containing dry paint film is about 3 μm or smaller.

10. A fuel tank formed from the Fe—Cr alloy structure according to claim 6.

11. A peripheral member of a fuel tank of an automobile formed from the Fe—Cr alloy structure according to claim 6.

12. A method for manufacturing an Fe—Cr alloy structure comprising applying, on a surface of an Fe—Cr alloy structure containing about 6% to about 25% by mass of Cr and including at least one gap portion, a corrosion-resistant film containing metal powder having ionization tendencies greater than iron, to a dry film thickness of about 5 μm to about 100 μm, so that the content of said metal powder in the dry paint film is about 20% to about 60% by volume, wherein the metal powder is zinc in an amount, based on the weight of the paint film, which satisfies Expression (1):

$$70-\{2.7\times(Cr+3.3Mo)\}\leq X\leq 70 \qquad (1)$$

wherein X is the metal zinc powder content (% by mass) in the paint film,
Cr is the Cr content (% by mass) in the Fe—Cr alloy, and Mo is the Mo content (% by mass) in the Fe—Cr alloy, wherein the composition of said Fe—Cr alloy structure is, in terms of % by mass, about 0.02% or less of C, about 1.0% or less of Si, about 0.5% to about 5.0% of Mn, about 0.05% or less of P, about 0.020% or less of S, about 6% to about 20% or less of Cr, about 1.0% or less of Al, and about 0.03% or less of N, with the remainder being essentially Fe and unavoidable impurities, which forms an alloy steel with a tensile strength (TS) of about 450 to about 650 MPa.

13. The method according to claim 12, wherein said Fe—Cr alloy structure further comprises, in terms of % by mass, about 3% or less of Mo, about 2% or less of Cu, and about 9% or less of Ni.

14. The method according to claim 12, wherein said Fe—Cr alloy structure further comprises, in terms of % by mass, about 0.0003% to about 0.005% of B.

15. The method according to claim 12, wherein the average particle diameter of Zn in said Zn-containing dry paint film is about 3 μm or smaller.

16. A method for manufacturing an Fe—Cr alloy structure comprising applying, on a surface of an Fe—Cr alloy structure containing about 6% to about 25% by mass of Cr and including at least one gap portion, a corrosion-resistant film containing metal powder having ionization tendencies greater than iron, to a dry film thickness of about 5 μm to about 100 μm, so that the content of said metal powder in the dry paint film is about 20% to about 60% by volume, wherein the metal powder is zinc in an amount, based on the weight of the paint film, which satisfies Expression (1):

$$70-\{2.7\times(Cr+3.3Mo)\}\leq X\leq 70 \qquad (1)$$

wherein X is the metal zinc powder content (% by mass) in the paint film,
Cr is the Cr content (% by mass) in the Fe—Cr alloy, and Mo is the Mo content (% by mass) in the Fe—Cr alloy, wherein said Fe—Cr alloy structure is a ferritic stainless steel, with a composition of, in terms of % by mass, about 0.1% or less of C, about 1.0% or less of Si, about 1.5% or less of Mn, about 0.06% or less of P, about 0.03% or less of S, about 1.0% or less of Al, about 11% to about 20% of Cr, and about 0.04% or less of N, about 0.01% to about 0.8% of Nb and/or about 0.01% to about 1.0% of Ti, with the remainder being essentially Fe and unavoidable impurities.

17. The method according to claim 16, wherein said Fe—Cr alloy structure further comprises one or more elements selected from the group consisting of about 3.0% or less of Mo, about 2.0% or less of Cu, and about 2.0% or less Ni in terms of % by mass.

18. The method according to claim 16, wherein said Fe—Cr alloy structure further comprises, in terms of % by mass, about 0.0003% to about 0.005% of B.

* * * * *